US009867077B2

(12) United States Patent
Ahmad et al.

(10) Patent No.: US 9,867,077 B2
(45) Date of Patent: *Jan. 9, 2018

(54) METHOD AND APPARATUS FOR DETECTING AND MANAGING USER PLANE CONGESTION

(71) Applicant: INTERDIGITAL PATENT HOLDINGS, INC., Wilmington, DE (US)

(72) Inventors: Saad Ahmad, Montreal (CA); Mahmoud Watfa, Saint Leonard (CA); Guanzhou Wang, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,523

(22) Filed: Feb. 8, 2017

(65) Prior Publication Data

US 2017/0150390 A1 May 25, 2017

Related U.S. Application Data

(63) Continuation of application No. 13/944,077, filed on Jul. 17, 2013, now Pat. No. 9,585,054.
(Continued)

(51) Int. Cl.
*H04W 28/02* (2009.01)
*H04L 12/859* (2013.01)
(Continued)

(52) U.S. Cl.
CPC ......... *H04W 28/0215* (2013.01); *H04L 47/10* (2013.01); *H04L 47/2475* (2013.01);
(Continued)

(58) Field of Classification Search
CPC ......... H04L 47/10; H04L 47/12; H04L 47/14; H04L 47/263; H04W 28/22; H04W 28/0231; H04W 28/02; H04W 28/0289
(Continued)

(56) References Cited

U.S. PATENT DOCUMENTS 6,865,185 B1    3/2005   Patel et al.
6,937,566 B1    8/2005   Forslow
(Continued)

FOREIGN PATENT DOCUMENTS

CN    102026303    4/2011
CN    102300264    12/2011
(Continued)

OTHER PUBLICATIONS

"3rd Generation Partnership Project 2; cdma2000 Packet Data Services; Wireless Local Area Network (WLAN) Interworking Access to Operator Service and Mobility", 3GPP2 TS X.S0028-200-0 V1.0, Mar. 2007, 56 pages.
(Continued)

*Primary Examiner* — Jae Y Lee
*Assistant Examiner* — Jean F Voltaire
(74) *Attorney, Agent, or Firm* — Quasim A. Shah

(57) ABSTRACT

A method and apparatus for managing user plane congestion in a network are disclosed. A method performed by a wireless transmit/receive unit (WTRU) for user plane congestion in a network includes receiving an indication from the network that user plane congestion exists in the network, transmitting a request for the network to provide a lower Quality of Service (QoS) level for a particular service based on the indication, and observing a decrease in user plane QoS based on the transmitted request.

20 Claims, 5 Drawing Sheets

Related U.S. Application Data

(60) Provisional application No. 61/673,366, filed on Jul. 19, 2012.

(51) Int. Cl.
*H04W 4/00* (2009.01)
*H04W 72/04* (2009.01)
*H04L 12/801* (2013.01)
*H04W 28/22* (2009.01)
*H04L 12/825* (2013.01)

(52) U.S. Cl.
CPC .......... *H04W 4/001* (2013.01); *H04W 28/02* (2013.01); *H04W 72/048* (2013.01); *H04L 47/12* (2013.01); *H04L 47/263* (2013.01); *H04W 28/0231* (2013.01); *H04W 28/0289* (2013.01); *H04W 28/22* (2013.01)

(58) Field of Classification Search
USPC ....................................................... 370/235
See application file for complete search history.

(56) References Cited

U.S. PATENT DOCUMENTS

| | | |
|---|---|---|
| 7,324,553 B1 | 1/2008 | Varier et al. |
| 8,346,225 B2 | 1/2013 | Raleigh |
| 8,681,739 B1 | 3/2014 | Zhao et al. |
| 8,743,829 B2 | 6/2014 | Guan et al. |
| 9,014,116 B2 | 4/2015 | Sridhar et al. |
| 9,197,378 B2 | 11/2015 | Ikeda et al. |
| 9,225,726 B2 | 12/2015 | Liang et al. |
| 2002/0114305 A1 | 8/2002 | Oyama et al. |
| 2004/0132436 A1 | 7/2004 | Dupont et al. |
| 2004/0166835 A1 | 8/2004 | Johansson et al. |
| 2004/0205752 A1 | 10/2004 | Chou et al. |
| 2004/0215828 A1 | 10/2004 | Li et al. |
| 2005/0058131 A1 | 3/2005 | Samuels et al. |
| 2007/0097926 A1 | 5/2007 | Liu et al. |
| 2007/0259673 A1 | 11/2007 | Willars et al. |
| 2008/0020775 A1 | 1/2008 | Willars |
| 2008/0212583 A1 | 9/2008 | Rey et al. |
| 2008/0214189 A1 | 9/2008 | Taaghol |
| 2009/0069025 A1 | 3/2009 | Pischella |
| 2009/0253433 A1 | 10/2009 | Voyer et al. |
| 2009/0279522 A1 | 11/2009 | Leroy et al. |
| 2009/0300207 A1 | 12/2009 | Giaretta et al. |
| 2009/0305701 A1 | 12/2009 | Giaretta et al. |
| 2010/0034089 A1 | 2/2010 | Kovvali et al. |
| 2010/0040024 A1 | 2/2010 | Wu |
| 2010/0067400 A1 | 3/2010 | Dolganow et al. |
| 2010/0080172 A1 | 4/2010 | Jin et al. |
| 2010/0081444 A1* | 4/2010 | Jin ...................... H04W 76/062 455/450 |
| 2010/0195503 A1 | 8/2010 | Raleigh |
| 2010/0208698 A1 | 8/2010 | Lu et al. |
| 2010/0208706 A1 | 8/2010 | Hirano et al. |
| 2010/0216462 A1 | 8/2010 | Aso et al. |
| 2010/0216484 A1 | 8/2010 | Zhou et al. |
| 2011/0007706 A1 | 1/2011 | Shaikh |
| 2011/0038304 A1 | 2/2011 | Lin et al. |
| 2011/0044279 A1 | 2/2011 | Johansson et al. |
| 2011/0055572 A1 | 3/2011 | Vogt et al. |
| 2011/0090794 A1 | 4/2011 | Cherian et al. |
| 2011/0103260 A1 | 5/2011 | Jeyatharan et al. |
| 2011/0158171 A1 | 6/2011 | Centonza et al. |
| 2011/0170408 A1 | 7/2011 | Furbeck et al. |
| 2011/0170410 A1* | 7/2011 | Zhao ...................... H04L 47/10 370/232 |
| 2011/0170517 A1 | 7/2011 | Bakker et al. |
| 2011/0194535 A1 | 8/2011 | Johansson et al. |
| 2011/0280130 A1 | 11/2011 | Foottit et al. |
| 2012/0002608 A1 | 1/2012 | Vesterinen et al. |
| 2012/0030331 A1 | 2/2012 | Karampatsis |
| 2012/0039175 A1 | 2/2012 | Sridhar et al. |
| 2012/0044804 A1 | 2/2012 | Rahman et al. |
| 2012/0069797 A1 | 3/2012 | Lim et al. |
| 2012/0079559 A1 | 3/2012 | Reznik et al. |
| 2012/0147750 A1 | 6/2012 | Pelletier et al. |
| 2012/0178416 A1 | 7/2012 | Miklos et al. |
| 2012/0188895 A1 | 7/2012 | Punz et al. |
| 2012/0201137 A1 | 8/2012 | Le Faucheur et al. |
| 2012/0246325 A1 | 9/2012 | Pancorbo Marcos et al. |
| 2012/0257499 A1 | 10/2012 | Chatterjee et al. |
| 2012/0314568 A1 | 12/2012 | Tan et al. |
| 2012/0324100 A1 | 12/2012 | Tomici et al. |
| 2012/0327779 A1* | 12/2012 | Gell .................. H04L 47/6275 370/238 |
| 2013/0021916 A1 | 1/2013 | Zhou et al. |
| 2013/0028193 A1 | 1/2013 | Rommer et al. |
| 2013/0058275 A1 | 3/2013 | Melia et al. |
| 2013/0121206 A1 | 5/2013 | Turanyi et al. |
| 2013/0195204 A1 | 8/2013 | Reznik et al. |
| 2013/0201824 A1 | 8/2013 | Venkatachalam et al. |
| 2014/0003391 A1 | 1/2014 | Vesterinen et al. |
| 2014/0126362 A1* | 5/2014 | Ogura .................... H04L 47/30 370/230 |
| 2014/0219248 A1 | 8/2014 | Reddiboyana et al. |
| 2014/0341109 A1 | 11/2014 | Cartmell et al. |
| 2015/0016299 A1 | 1/2015 | Zhang et al. |
| 2016/0112896 A1 | 4/2016 | Karampatsis et al. |

FOREIGN PATENT DOCUMENTS

| | | |
|---|---|---|
| EP | 2170002 | 3/2010 |
| EP | 2192799 | 6/2010 |
| EP | 2448194 | 5/2012 |
| JP | 2006-101400 | 4/2006 |
| JP | 2011-525319 | 9/2011 |
| JP | 2013-530640 | 7/2013 |
| WO | WO-2004/084500 | 9/2004 |
| WO | WO-2010/022374 | 2/2010 |
| WO | WO-2010/072652 | 7/2010 |
| WO | WO-2010/080966 | 7/2010 |
| WO | WO-2010/102652 | 9/2010 |
| WO | WO-2010/121191 | 10/2010 |
| WO | WO-2011/025438 | 3/2011 |
| WO | WO-2011/039985 | 4/2011 |
| WO | WO-2011/069096 | 6/2011 |
| WO | WO-2011/149533 | 12/2011 |
| WO | WO-2012/018824 | 2/2012 |
| WO | WO-2012/033774 | 3/2012 |
| WO | WO-2013/134669 | 9/2013 |

OTHER PUBLICATIONS

"3rd Generation Partnership Project; Technical Specification Group Core Network and Terminals; Access Network Discovery and Selection Function (ANDSF) Management Object (MO) (Release 10)", 3GPP TS 24.312 V10.2.1, Apr. 2011, 153 pages.

"3rd Generation Partnership Project; Technical Specification Group Core Network and Terminals; Access Network Discovery and Selection Function (ANDSF) Management Object (MO) (Release 11)", 3GPP TS 24.312 V11.5.0, Dec. 2012, 173 pages.

"3rd Generation Partnership Project; Technical Specification Group Core Network and Terminals; Access Network Discovery and Selection Function (ANDSF); Management Object (MO); Release 10", 3GPP TS 24.312 V10.3.0, Jun. 2011, 155 pages.

"3rd Generation Partnership Project; Technical Specification Group Core Network and Terminals; Access to the 3GPP Evolved Package Core (EPC) via non-3GPP access networks; Stage 3 (Release 10)", 3GPP TS 24.302 V10.4.0, Jun. 2011, 58 pages.

"3rd Generation Partnership Project; Technical Specification Group Core Network and Terminals; Access to the 3GPP Evolved Packet Core (EPC) via non-3GPP access networks; Stage 3 (Release 10)", 3GPP TS 24.302 V10.3.1, Apr. 2011, 57 pages.

"3rd Generation Partnership Project; Technical Specification Group Core Network and Terminals; Access to the 3GPP Evolved Packet Core (EPC) via non-3GPP access networks; Stage 3 (Release 10)", 3GPP TS 24.302 V10.7.0, Mar. 2012, 58 pages.

(56) References Cited

OTHER PUBLICATIONS

"3rd Generation Partnership Project; Technical Specification Group Core Network and Terminals; Access to the 3GPP Evolved Packet Core (EPC) via non-3GPP access networks; Stage 3 (Release 11)", 3GPP TS 24.302 V11.3.0, Jun. 2012, 60 pages.
"3rd Generation Partnership Project; Technical Specification Group Core Network and Terminals; Access to the 3GPP Evolved Packet Core (EPC) via non-3GPP access networks; Stage 3 (Release 11)", 3GPP TS 24.302 V11.7.0, Jun. 2013, 61 pages.
"3rd Generation Partnership Project; Technical Specification Group Core Network and Terminals; Access to the 3GPP Evolved Packet Core (EPC) via non-3GPP access networks; Stage 3 (Release 12)", 3GPP TS 24.302 V12.1.0, Jun. 2013, 68 pages.
"3rd Generation Partnership Project; Technical Specification Group Core Network and Terminals; Access to the 3GPP Evolved Packet Core (EPC) via non-3GPP access networks; Stage 3 (Release 8)", 3GPP TS 24.302 V8.10.0, Sep. 2011, 50 pages.
"3rd Generation Partnership Project; Technical Specification Group Core Network and Terminals; Access to the 3GPP Evolved Packet Core (EPC) via non-3GPP access networks; Stage 3 (Release 9)", 3GPP TS 24.302 V9.7.0, Sep. 2011, 53 pages.
"3rd Generation Partnership Project; Technical Specification Group Core Network and Terminals; IP multimedia call control protocol based on Session Initiation Protocol (SIP) and Session Description Protocol (SDP); Stage 3 (Release 10)", 3GPP TS 24.229 V10.3.0, Mar. 2011, 702 pages.
"3rd Generation Partnership Project; Technical Specification Group Core Network and Terminals; Non-Access-Stratum (NAS) protocol for Evolved Packet System (EPS); Stage 3 (Release 11)", 3GPP TS 24.301 V11.3.0, Jun. 2012, 335 pages.
"3rd Generation Partnership Project; Technical Specification Group Core Network and Terminals; Non-Access-Stratum (NAS) protocol for Evolved Packet System (EPS); Stage 3 (Release 10)", 3GPP TS 24.301 V10.7.0, Jun. 2012, 322 pages.
"3rd Generation Partnership Project; Technical Specification Group Core Network and Terminals; Non-Access-Stratum (NAS) protocol for Evolved Packet System (EPS); Stage 3 (Release 10)", 3GPP TS 24.301 V10.11.0, Jun. 2013, 322 pages.
"3rd Generation Partnership Project; Technical Specification Group Core Network and Terminals; Non-Access-Stratum (NAS) protocol for Evolved Packet System (EPS); Stage 3 (Release 11)", 3GPP TS 24.301 V11.7.0, Jun. 2013, 345 pages.
"3rd Generation Partnership Project; Technical Specification Group Core Network and Terminals; Non-Access-Stratum (NAS) protocol for Evolved Packet System (EPS); Stage 3 (Release 12)", 3GPP TS 24.301 V12.1.0, Jun. 2013, 350 pages.
"3rd Generation Partnership Project; Technical Specification Group Core Network and Terminals; Non-Access-Stratum (NAS) protocol for Evolved Packet System (EPS); Stage 3 (Release 8)", 3GPP TS 24.301 V8.10.0, Jun. 2011, 277 pages.
"3rd Generation Partnership Project; Technical Specification Group Core Network and Terminals; Non-Access-Stratum (NAS) protocol for Evolved Packet System (EPS); Stage 3 (Release 9)", 3GPP TS 24.301 V9.10.0, Jun. 2012, 300 pages.
"3rd Generation Partnership Project; Technical Specification Group Core Network and Terminals; Non-Access-Stratum (NAS) protocol for Evolved Packet System (EPS); Stage 3 (Release 9)", 3GPP TS 24.301 V9.11.0, Mar. 2013, 300 pages.
"3rd Generation Partnership Project; Technical Specification Group Core Network and Terminals; Policy and Charging Control over Gx/Sd reference point (Release 11)", 3GPP TS 29.212 V11.1.0, Jun. 2011, 152 pages.
"3rd Generation Partnership Project; Technical Specification Group Core Network and Terminals; Proxy Mobile IPv6 (PMIPv6) based Mobility and Tunnelling protocols; Stage 3 (Release 10)", 3GPP TS 29.275 V10.2.0, Jun. 2011, 72 pages.
"3rd Generation Partnership Project; Technical Specification Group Core Network and Terminals; Proxy Mobile IPv6 (PMIPv6) based Mobility and Tunnelling protocols; Stage 3 (Release 9)", 3GPP TS 29.275 V9.5.0, Jun. 2011, 71 pages.
"3rd Generation Partnership Project; Technical Specification Group Core Network and Terminals; Proxy Mobile IPv6 (PMIPv6) based Mobility and Tunnelling protocols; Stage 3 (Release 9)", 3GPP TS 29.275 V9.2.0, Jun. 2010, 74 pages.
"3rd Generation Partnership Project; Technical Specification Group Core Network and Terminals; User Data Convergence (UDC); Technical realization and information flows; Stage 2 (Release 10)", 3GPP TS 23.335 V10.0.0, Mar. 2011, 39 pages.
"3rd Generation Partnership Project; Technical Specification Group Core Network and Terminals; User Data Convergence (UDC); Technical realization and information flows; Stage 2 (Release 11)", 3GPP TS 23.335 V11.0.0, Sep. 2012, 39 pages.
"3rd Generation Partnership Project; Technical Specification Group Core Network and Terminals; User Data Convergence (UDC); Technical realization and information flows; Stage 2 (Release 9)", 3GPP TS 23.335 V9.3.0, Dec. 2010, 39 pages.
"3rd Generation Partnership Project; Technical Specification Group Radio Access Network; Evolved Universal Terrestrial Radio Access Network (E-UTRAN); S1 Application Protocol (S1AP) (Release 10)", 3GPP TS 36.413 V10.6.0, Jun. 2012, 255 pages.
"3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.0.0, Jun. 2012, 258 pages.
"3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.4.0, Jun. 2013, 274 pages.
"3rd Generation Partnership Project; Technical Specification Group Radio Access Network; Evolved Universal Terrestrial Radio Access Network (E-UTRAN); S1 Application Protocol (S1AP) (Release 8)", 3GPP TS 36.413 V8.10.0, Jun. 2010, 217 pages.
"3rd Generation Partnership Project; Technical Specification Group Radio Access Network; Evolved Universal Terrestrial Radio Access Network (E-UTRAN); S1 Application Protocol (S1AP) (Release 10)", 3GPP TS 36.413 V10.5.0, Mar. 2012, 255 pages.
"3rd Generation Partnership Project; Technical Specification Group Radio Access Network; Evolved Universal Terrestrial Radio Access Network (E-UTRAN); S1 Application Protocol (S1AP) (Release 9)", 3GPP TS 36.413 V9.8.0, Dec. 2011, 243 pages.
"3rd Generation Partnership Project; Technical Specification Group Radio Access Network; Physical layer; Measurements (FDD) (Release 10)", 3GPP TS 25.215 V10.0.0, Mar. 2011, 23 pages.
"3rd Generation Partnership Project; Technical Specification Group SA; Feasibility Study on User Plane Congestion Management (Release 12)", 3GPP TR 22.805 V0.3.1, May 2012, 32 pages.
"3rd Generation Partnership Project; Technical Specification Group SA; Feasibility Study on User Plane Congestion Management (Release 12)", 3GPP TR 22.805 V1.0.0, Jun. 2012, 32 pages.
"3rd Generation Partnership Project; Technical Specification Group Services and System Aspects; 3GPP System Architecture Evolution (SAE); Security aspects of non-3GPP accesses (Release 10)", 3GPP TS 33.402 V10.3.0, Mar. 2012, 52 pages.
"3rd Generation Partnership Project; Technical Specification Group Services and System Aspects; 3GPP system to Wireless Local Area Network (WLAN) interworking; System description (Release 9)", 3GPP TS 23.234 V9.0.0, Dec. 2009, 84 pages.
"3rd Generation Partnership Project; Technical Specification Group Services and System Aspects; Architecture enhancements for non-3GPP accesses (Release 10)", 3GPP TS 23.402 V10.3.0, Mar. 2011, 227 pages.
"3rd Generation Partnership Project; Technical Specification Group Services and System Aspects; Architecture enhancements for non-3GPP accesses (Release 10)", 3GPP TS 23.402 V10.1.0, Sep. 2010, 227 pages.
"3rd Generation Partnership Project; Technical Specification Group Services and System Aspects; Architecture enhancements for non-3GPP accesses (Release 10)", 3GPP TS 23.402 V10.2.1, Jan. 2011, 228 pages.
"3rd Generation Partnership Project; Technical Specification Group Services and System Aspects; Architecture enhancements for non-3GPP accesses (Release 10)", 3GPP TS 23.402 V10.7.0, Mar. 2012, 232 pages.

(56) References Cited

OTHER PUBLICATIONS

"3rd Generation Partnership Project; Technical Specification Group Services and System Aspects; Architecture enhancements for non-3GPP accesses (Release 10)", 3GPP TS 23.402 V10.8.0, Sep. 2012, 232 pages.

"3rd Generation Partnership Project; Technical Specification Group Services and System Aspects; Architecture enhancements for non-3GPP accesses (Release 11)", 3GPP TS 23.402 V11.3.0, Jun. 2012, 252 pages.

"3rd Generation Partnership Project; Technical Specification Group Services and System Aspects; Architecture enhancements for non-3GPP accesses (Release 11)", 3GPP TS 23.402 V11.7.0, Jun. 2013, 252 pages.

"3rd Generation Partnership Project; Technical Specification Group Services and System Aspects; Architecture enhancements for non-3GPP accesses (Release 12)", 3GPP TS 23.402 V12.1.0, Jun. 2013, 254 pages.

"3rd Generation Partnership Project; Technical Specification Group Services and System Aspects; Architecture enhancements for non-3GPP accesses (Release 8)", 3GPP TS 23.402 V8.10.0, Mar. 2012, 199 pages.

"3rd Generation Partnership Project; Technical Specification Group Services and System Aspects; Architecture enhancements for non-3GPP accesses (Release 9)", 3GPP TS 23.402 V9.5.0, Jun. 2010, 200 pages.

"3rd Generation Partnership Project; Technical Specification Group Services and System Aspects; Architecture enhancements for non-3GPP accesses (Release 9)", 3GPP TS 23.402 V9.12.0, Mar. 2012, 200 pages.

"3rd Generation Partnership Project; Technical Specification Group Services and System Aspects; Data Identification in ANDSF (DIDA) (Release 11)", 3GPP TR 23.8xy V0.1.0, Apr. 2011, 8 pages.

"3rd Generation Partnership Project; Technical Specification Group Services and System Aspects; Feasibility study on 3GPP system to Wireless Local Area Network (WLAN) interworking (Release 9)", 3GPP TR 22.934 V9.0.0, Dec. 2009, 30 pages.

"3rd Generation Partnership Project; Technical Specification Group Services and System Aspects; Feasibility study on 3GPP system to Wireless Local Area Network (WLAN) interworking (Release 9)", 3GPP TR 22.934 V9.1.0, Sep. 2010, 30 pages.

"3rd Generation Partnership Project; Technical Specification Group Services and System Aspects; Feasibility study on user plane congestion management (Release 12)", 3GPP TR 22.805 V12.1.0, Dec. 14, 2012, 36 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.0.0, Jun. 2010, 261 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.4.0, Jun. 2011, 281 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 9)", 3GPP TS 23.401 V9.5.0, Jun. 2010, 259 pages.

"3rd Generation Partnership Project; Technical Specification Group Services and System Aspects; General Packet Radio Service (GPRS); Service description; Stage 2 (Release 9)", 3GPP TS 23.060 V9.5.0, Jun. 2010, 298 pages.

"3rd Generation Partnership Project; Technical Specification Group Services and System Aspects; Generic Authentication Architecture (GAA); Access to network application functions using Hypertext Transfer Protocol over Transport Layer Security (HTTPS)", 3GPP TS 33.222 V10.0.1, Dec. 2011, 22 pages.

"3rd Generation Partnership Project; Technical Specification Group Services and System Aspects; Generic Authentication Architecture (GAA); Generic Bootstrapping Architecture (GBA) (Release 10)", 3GPP TS 33.220 V10.1.0, Mar. 2012, 75 pages.

"3rd Generation Partnership Project; Technical Specification Group Services and System Aspects; Generic Authentication Architecture (GAA); Support for subscriber certificates (Release 10)", 3GPP TS 33.221 V10.0.0, Mar. 2011, 25 pages.

"3rd Generation Partnership Project; Technical Specification Group Services and System Aspects; IP flow mobility and seamless Wireless Local Area Network (WLAN) offload; Stage 2 (Release 10)", 3GPP TS 23.261 V10.0.0, Jun. 10, 2010, 20 pages.

"3rd Generation Partnership Project; Technical Specification Group Services and System Aspects; IP flow mobility and seamless Wireless Local Area Network (WLAN) offload; Stage 2 (Release 10)", 3GPP TS 23.261 V10.2.0, Mar. 2012, 22 pages.

"3rd Generation Partnership Project; Technical Specification Group Services and System Aspects; IP flow mobility and seamless Wireless Local Area Network (WLAN) offload; Stage 2 (Release 10)", 3GPP TS 23.261 V10.1.0, Sep. 2010, 22 pages.

"3rd Generation Partnership Project; Technical Specification Group Services and System Aspects; IP flow mobility and seamless Wireless Local Area Network (WLAN) offload; Stage 2 (Release 11)", 3GPP TS 23.261 V11.0.0, Sep. 2012, 22 pages.

"3rd Generation Partnership Project; Technical Specification Group Services and System Aspects; IP Flow Mobility and seamless WLAN offload; Stage 2 (Release 10)", 3GPP TS 23.261 V0.3.0, Mar. 2010, 20 pages.

"3rd Generation Partnership Project; Technical Specification Group Services and System Aspects; IP Multimedia Subsystem (IMS); Stage 2 (Release 11)", 3GPP TS 23.228 V11.0.0, Mar. 2011, 272 pages.

"3rd Generation Partnership Project; Technical Specification Group Services and System Aspects; Mobility between 3GPP-Wireless Local Area Network (WLAN) interworking and 3GPP systems (Release 10)", 3GPP TS 23.327 V10.0.0, Mar. 2011, 27 pages.

"3rd Generation Partnership Project; Technical Specification Group Services and System Aspects; Mobility between 3GPP-Wireless Local Area Network (WLAN) interworking and 3GPP systems (Release 9)", 3GPP TS 23.327 V9.0.0, Dec. 2009, 27 pages.

"3rd Generation Partnership Project; Technical Specification Group Services and System Aspects; Multi access PDN connectivity and IP flow mobility (Release 9)", 3GPP TR 23.861 V1.3.0, Sep. 2009, 49 pages.

"3rd Generation Partnership Project; Technical Specification Group Services and System Aspects; Network based IP flow mobility (Release 12)", 3GPP TR 23.861 V1.7.0, Nov. 2012, 79 pages.

"3rd Generation Partnership Project; Technical Specification Group Services and System Aspects; Policy and charging control architecture (Release 10)", 3GPP TS 23.203 V10.0.0, Jun. 2010, 126 pages.

"3rd Generation Partnership Project; Technical Specification Group Services and System Aspects; Policy and charging control architecture (Release 10)", 3GPP TS 23.203 V10.7.0, Jun. 2012, 131 pages.

"3rd Generation Partnership Project; Technical Specification Group Services and System Aspects; Policy and charging control architecture (Release 10)", 3GPP TS 23.203 V10.8.0, Sep. 2012, 131 pages.

"3rd Generation Partnership Project; Technical Specification Group Services and System Aspects; Policy and charging control architecture (Release 11)", 3GPP TS 23.203 V11.1.0, Mar. 2011, 136 pages.

"3rd Generation Partnership Project; Technical Specification Group Services and System Aspects; Policy and charging control architecture (Release 11)", 3GPP TS 23.203 V11.2.0, Jun. 2011, 142 pages.

"3rd Generation Partnership Project; Technical Specification Group Services and System Aspects; Policy and charging control architecture (Release 11)", 3GPP TS 23.203 V11.3.0, Sep. 2011, 167 pages.

"3rd Generation Partnership Project; Technical Specification Group Services and System Aspects; Policy and charging control architecture (Release 11)", 3GPP TS 23.203 V11.6.0, Jun. 2012, 177 pages.

(56) References Cited

OTHER PUBLICATIONS

"3rd Generation Partnership Project; Technical Specification Group Services and System Aspects; Policy and charging control architecture (Release 11)", 3GPP TS 23.203 V11.10.0, Jun. 2013, 182 pages.
"3rd Generation Partnership Project; Technical Specification Group Services and System Aspects; Policy and charging control architecture (Release 12)", 3GPP TS 23.203 V12.1.0, Jun. 2013, 189 pages.
"3rd Generation Partnership Project; Technical Specification Group Services and System Aspects; Policy and charging control architecture (Release 7)", 3GPP TS 23.203 V7.14.1, Jul. 2012, 76 pages.
"3rd Generation Partnership Project; Technical Specification Group Services and System Aspects; Policy and charging control architecture (Release 8)", 3GPP TS 23.203 V8.14.0, Jun. 2012, 116 pages.
"3rd Generation Partnership Project; Technical Specification Group Services and System Aspects; Policy and charging control architecture (Release 9)", 3GPP TS 23.203 V9.5.0, Jun. 2010, 123 pages.
"3rd Generation Partnership Project; Technical Specification Group Services and System Aspects; Policy and charging control architecture (Release 9)", 3GPP TS 23.203 V9.12.0, Jun. 2012, 124 pages.
"3rd Generation Partnership Project; Technical Specification Group Services and System Aspects; Study on Policy solutions and enhancements (Release 10)", 3GPP TR 23.813 V0.5.0, Feb. 2011, 40 pages.
"3rd Generation Partnership Project; Technical Specification Group Services and System Aspects; Study on Policy solutions and enhancements (Release 11)", 3GPP TR 23.813 V11.0.0, Jun. 2011, 41 pages.
"3rd Generation Partnership Project; Technical Specification Group Services and System Aspects; System Enhancements for User Plane Congestion Management (Release 12)", 3GPP TR 23.705 V0.5.0, Jun. 2013, 32 pages.
"CN Aspects of Service Identification for RRC Improvements in GERAN", 3GPP Tdoc C4-112729, 3GPP TSG CT WG4 Meeting #55, San Francisco, US, Nov. 14-18, 2011, 5 pages.
"Communication pursuant to Article 94(3) EPC", European Patent Application No. 13 708 293.9-1857, Dec. 23, 2016, 4 pages.
"Email Thread RE: [MEXT] Text for Binding Update Race condition issue", Mobile IPv6 Extensions, Apr. 6, 2009, 5 pages.
"English Language Abstract", Chinese Patent Application No. 102026303, Apr. 20, 2011, 1 page.
"Examination Notification", Taiwanese Patent Application No. 102125682, dated Oct. 14, 2016, 3 pages.
"Examination Notification", Taiwanese Patent Application No. 102105530, dated Oct. 16, 2016, 9 pages.
"Examination Notification (English Translation)", Taiwanese Patent Application No. 102125682, dated Oct. 14, 2016, 3 pages.
"Examination Notification (English Translation)", Taiwanese Patent Application No. 102105530, dated Oct. 16, 2016, 7 pages.
"International Preliminary Report on Patentability from the International Preliminary Examining Authority", International Application No. PCT/US2014/011099, dated Jan. 16, 2015, 16 pages.
"International Search Report and the Written Opinion of the International Searching Authority", International Application No. PCT/US2013/026550, dated May 21, 2013, 10 pages.
"International Search Report and Written Opinion of the International Search Authority", International Application No. PCT/US2012/057068, dated Feb. 8, 2013, 14 pages.
"International Search Report and Written Opinion of the International Searching Authority", International Application No. PCT/US2014/011099, dated Apr. 15, 2014, 12 pages.
"International Search Report and Written Opinion of the International Searching Authority", International Application No. PCT/US2012/033560, dated Jul. 19, 2012, 14 pages.
"International Search Report and Written Opinion of the International Searching Authority", International Application No. PCT/US2011/050577, dated Sep. 19, 2012, 18 pages.
"Invitation to Pay Additional Fees and Partial International Search", International Application No. PCT/US2013/046174, dated Oct. 10, 2013, 5 pages.
"Invitation to Pay Additional Fees and Partial International Search", International Application No. PCT/US2011/050577, dated Jan. 19, 2012, 6 pages.
"Invitation to Pay Additional Fees and Partial International Search", International Application No. PCT/US2013/051029, dated Nov. 27, 2013, 7 pages.
"New WID for Data identification in ANDSF", 3GPP Tdoc SP-110084, 3GPP TSG SA Meeting #51 Kansas City, USA, Mar. 21-23, 2011, 5 pages.
"Notice of Allowance", U.S. Appl. No. 14/376,973, dated Jun. 21, 2017, 6 pages.
"Official Notice of Rejection", Japanese Patent Application No. 2015-523244, dated Feb. 2, 2016, 6 pages.
"Official Notice of Rejection", Japanese Patent Application No. 2014-557858, dated Jan. 24, 2017, 9 pages.
"Official Notice of Rejection (English Translation)", Japanese Patent Application No. 2014-557858, dated Jan. 24, 2017, 11 pages.
"Official Notice of Rejection (English Translation)", Japanese Patent Application No. 2015-523244, dated Feb. 2, 2016, 7 pages.
"Patent Abstracts of Japan", JP 2006-101400, Apr. 13, 2006, 1 page.
"U.S. Appl. No. 12/684,227", filed Jan. 8, 2010.
"U.S. Appl. No. 13/446,685", filed Apr. 13, 2012.
"United States Notice of Allowance", U.S. Appl. No. 13/820,724, dated Jul. 23, 2015, 20 pages.
"United States Office Action", U.S. Appl. No. 14/759,818, dated Jan. 11, 2017, 13 pages.
"United States Office Action", U.S. Appl. No. 13/944,077, dated Mar. 26, 2015, 13 pages.
"United States Office Action", U.S. Appl. No. 14/376,973, dated Aug. 15, 2016, 18 pages.
"United States Office Action", U.S. Appl. No. 13/820,724, dated Jan. 16, 2015, 20 pages7.
"United States Office Action", United States Office Action U.S. Appl. No. 13/446,685, dated Jan. 2, 2015, 16 pages.
"United States Office Action", U.S. Appl. No. 15/056,512, dated Feb. 1, 2017, 24 pages.
"United States Office Action", U.S. Appl. No. 13/944,077, dated Jun. 16, 2016, 25 pages.
"United States Office Action", U.S. Appl. No. 14/376,973, dated Mar. 30, 2016, 17 pages.
"United States Office Action", U.S. Appl. No. 14/408,133, dated Jun. 22, 2017, 53 pages.
"WID for Study on User plane congestion management", 3GPP Tdoc S2-113383, 3GPP SA WG2 Meeting #85 Naantali, Finland, Jul. 11-15, 2011, 5 pages.
"WID for Study on User plane congestion management", 3GPP Tdoc S2-113752, 3GPP SA WG2 Meeting #85 Naantali, Finland, Jul. 11-15, 2011, 5 pages.
"Written Opinion of the International Preliminary Examining Authority", International Application No. PCT/US2013/026550, dated Jun. 3, 2014, 10 pages.
"Written Opinion of the International Preliminary Examining Authority", International Application No. PCT/US2012/057068, dated Oct. 17, 2013, 7 pages.
Alcatel-Lucent, "Policy based terminal triggered, ANDSF decided access selection", 3GPP Tdoc S2-081658, 3GPP TSG SA WG2 Architecture—S2 Meeting #63, Athens, Greece, Feb. 18-22, 2008, 6 pages.
Bernardos, C.J., "Proxy Mobile IPv6 Extensions to Support Flow Mobility", draft-bernardos-netext-pmipv6-flowmob-03 (work in progress), Mar. 14, 2011, 20 pages.
China Mobile, "Interface/Network Selection based on UE detected Network Information", 3GPP Tdoc S2-113264; 3GPP SA WG2 Meeting #86, Naantali, Finland, Jul. 11-15, 2011, 2 pages.
China Mobile, et al., "Policy control based on network condition", 3GPP Tdoc S2-105228, 3GPP TSG WG2 Meeting #81, Prague, Czech Republic, Oct. 11-15, 2010, 4 pages.

(56) References Cited

OTHER PUBLICATIONS

Das, S., et al., "DHCPv4 and DHCPv6 Options for Access Network Discovery and Selection Function (ANDSF) Discovery", The Internet Engineering Task Force (IETF) Request for Comment (RFC) 6153, Feb. 2011, 7 pages.

Huawei, "Discussion on H(e)NB LIPA/SIPTO management requirements", 3GPP Tdoc S5-101780, 3GPP TSG-SA5 (Telecom Management) SA5 Meeting #72, Jul. 12-16, 2010, 3 pages.

I2R, "eICIC for HeNB UL and MUE DL based on HeNB UL Measurement", 3GPP Tdoc R1-104732, 3GPP TSG RAN WG1 Meeting #62;, Madrid, Spain, Aug. 23-27, 2010, 5 pages.

IEEE, "Part 11: Wireless LAN Medium Access Control (MAC) and Physical Layer (PHY) Specifications, Amendment 9: Interworking with External Networks", IEEE Std 802.11u-2011, Feb. 25, 2011, 208 pages.

ITU-T, "Opinion model for video-telephony applications", ITU-T Recommendation G.1070, Apr. 2007, 28 pages.

Johnson, D., et al., "Mobility Support in IPv6", The Internet Engineering Task Force (IETF) Request for Comment (RFC) 3775, Jun. 2004, 165 pages.

Kddi, et al., "P-CR to TR 22.805 on Section 6 Potential Requirements", 3GPP Tdoc S1-121074; 3GPP TSG-SA WG1 Meeting #58, Seville, Spain, May 7-11, 2012, 6 pages.

Kddi, "UPCON solution framework for RAN user plane congestion", 3GPP Tdoc S2-130287, 3GPP SA WG2 Meeting #95, Prague, Czech Republic, Jan. 28-Feb. 1, 2013, 4 Pages.

LG Electronics, "Traffic steering across multiple PDN connections over 3GPP access", 3GPP Tdoc S2-105026, 3GPP TSG SA WG2 Meeting # 81 Prague, Czech Republic, Oct. 11-15, 2010, 5 Pages.

Mark, Brian, et al., "A Multipath Flow Routing Approach for Increasing Throughput in the Internet", George Mason University, Dept. of Electrical and Computer Engineering, Aug. 2007, 4 pages.

Melia, T., "Logical Interface Support for multi-mode IP Hosts", draft-melia-netext-logical-interface-support-01, Jul. 5, 2010, 20 pages.

NEC, NTT DOCOMO, et al., "Use Cases for User Plane Congestion Management (UPCON)", 3GPP Tdoc S1-113149, Sep. 6, 2011, 11 pages.

Nokia Siemens Networks, "On X2 Signaling for TDM eICIC in Macro+Pico Scenarios", 3GPP Tdoc R3-103555, 3GPP TSG RAN WG3 #70 Meeting, Jacksonville, United States, Nov. 15-19, 2010, 4 pages.

NTT DOCOMO, "Considering RAT Congestion Scenario in UPCON SID", SA WG2, Tdoc S2-113253, Meeting #86, Naantali, Finland, Jul. 11-15, 2011, 2 pages.

Open Mobile Alliance, "OMA Device Management Representation Protocol", OMA-TS-DM_RepPro-V2_0-20101011-D, Oct. 11, 2010, 76 pages.

Qualcomm Inc., et al., "Congestion in Multiple Access Communication Schemes", 3GPP Tdoc S1-121111; 3GPP TSG-SA WG1 Meeting #58, Seville, Spain, May 7-11, 2012, 5 pages.

Shehada, Mohammed, "Overview of 3GPP Study Item UPCON: User Plane Congestion Control (TR 22.805 V0.2.0 (Feb. 2012))", 38th Meeting of the VDE/ITG group 5.2.4 "Mobility in IP-based networks", Mar. 13, 2012, 19 pages.

Sklower, "The PPP Multilink Protocol (MP)", The Internet Engineering Task Force (IETF) Request for Comment (RFC) 1990, Aug. 1996, 23 pages.

Soliman, H., et al., "Flow Bindings in Mobile IPv6 and NEMO Basic Support", draft-ietf-mext-flow-binding-01 (work in progress), Feb. 13, 2009, 31 pages.

Soliman, H., et al., "Flow Bindings in Mobile IPv6 and NEMO Basic Support", draft-ietf-mext-flow-binding-04 (work in progress), Nov. 9, 2009, 37 pages.

Soliman, H., et al., "Flow Bindings in Mobile IPv6 and NEMO Basic Support", draft-ietf-mext-flow-binding-06 (work in progress), Mar. 1, 2010, 39 pages.

Soliman, H., "Mobile IPv6 Support for Dual Stack Hosts and Routers", The Internet Engineering Task Force (IETF) Request for Comment (RFC) 5555, Jun. 2009, 41 pages.

Tansir, Ahmed, et al., "Multi Access Data Network Connectivity and IP Flow Mobility in Evolved Packet System (EPS)", Wireless Communications and Networking Conference (WCNC) 2010, IEEE, Piscataway, NJ; USA, Apr. 18, 2010, 6 pages.

Tsirtsis, G., et al., "Traffic Selectors for Flow Bindings", draft-ietf-mext-binary-ts-02 (work in progress), Dec. 16, 2009, 18 Pages.

Tsirtsis, G., et al., "Traffic Selectors for Flow Bindings", draft-ietf-mext-binary-ts-04 (work in progress), Feb. 26, 2010, 19 pages.

Wakikawa, Ryuji, et al., "Multiple Care-of Addresses Registration", The Internet Engineering Task Force (IETF) Request for Comment (RFC) 5648, Oct. 2009, 36 pages.

"English Language Abstract", Chinese Patent Application No. 102300264, dated Dec. 28, 2011, 1 page.

"First Notification of Office Action", Chinese Patent Application No. 201380038480.4, dated Jul. 24, 2017, 19 pages.

"First Notification of Office Action (English Translation)", Chinese Patent Application No. 201380038480.4, dated Jul. 24, 2017, 12 pages.

\* cited by examiner

US 9,867,077 B2

METHOD AND APPARATUS FOR DETECTING AND MANAGING USER PLANE CONGESTION

CROSS REFERENCE TO RELATED APPLICATIONS

This application is a continuation of U.S. patent application Ser. No. 13/944,077, filed Jul. 17, 2013, which claims the benefit of U.S. Provisional Patent Application No. 61/673,366 filed Jul. 19, 2012; each of which is incorporated by reference herein.

BACKGROUND

When user plane congestion occurs in a wireless communication system including a wireless transmit/receive unit (WTRU) and a network, (for example, a radio access network (RAN) or a core network (CN)), the congestion may be detected and reduced by applying a congestion control mechanism based on a per user basis, a per application basis, or a per content user basis. A per user congestion control mechanism may reduce the traffic of the users of lower quality of service (QoS) assurance to alleviate the congestion, while maintaining the traffic rate of the users of higher QoS assurance. A per application congestion control mechanism may delay or drop the traffic of certain non-critical applications, such as file transfer protocol (FTP) downloading, social applications, and the like, to alleviate the congestion and reallocate the resource to more critical applications, such as a voice call. A per content type congestion control mechanism may subject a particular media type, which is more resource consuming but less important, such as video, to some control method, for example, compression or transcoding. The mechanisms described above may be used in combination.

There is currently no mechanism available for the system to classify certain subscribers as users that may have paid an extra premium such that a satisfactory level of service may still be enjoyed despite congestion. For example, the system may allow different levels of subscriptions, and each may have different implications to user experience when congestion occurs. Consequently, the system may not be able to revert back to normal services when congestion terminates. Nodes, such as evolved Node-Bs (eNBs), may be the only nodes involved in responding to congestion level changes. These nodes may not have the capability or functionality to modify their behavior in response to an indication from other parts of the system. Therefore, there may be a lack of congestion related information exchange between CN nodes, (for example, a mobility management entity (MME) or a packet data network (PDN) gateway (GW)), and the eNB.

Further, the network may not be able to inform a WTRU about congestion in the system, such that certain applications or traffic types may not be allowed, even though other types of applications, (for example, those that may not require high QoS resources), may be handled by the network. Currently, the network may inform the WTRU that it is congested, which may result in the WTRU failing to access the network for services that require minimal QoS. Moreover, the network may inform the WTRU to take certain actions or the mere indication from the network may lead the WTRU to execute certain procedures that may help reduce the congestion in the network. Such behavior may not be supported by the network.

In relation to WTRU-awareness of congestion, there is also no user awareness of network congestion. This may be desired as the user may prefer certain applications over others. Thus, the WTRU may reflect user preference to the network so that certain traffic may be allowed when sacrifices need to be made, (in the form of providing a limited QoS or supporting a subset of applications only).

SUMMARY

A method and apparatus for managing user plane congestion in a network are disclosed. A method performed by a wireless transmit/receive unit (WTRU) for user plane congestion in a network includes receiving an indication from the network that user plane congestion exists in the network, transmitting a request for the network to provide a lower Quality of Service (QoS) level for a particular service based on the indication, and observing a decrease in user plane QoS based on the transmitted request.

BRIEF DESCRIPTION OF THE DRAWINGS

A more detailed understanding may be had from the following description, given by way of example in conjunction with the accompanying drawings wherein.

DETAILED DESCRIPTION

Figure 1A:
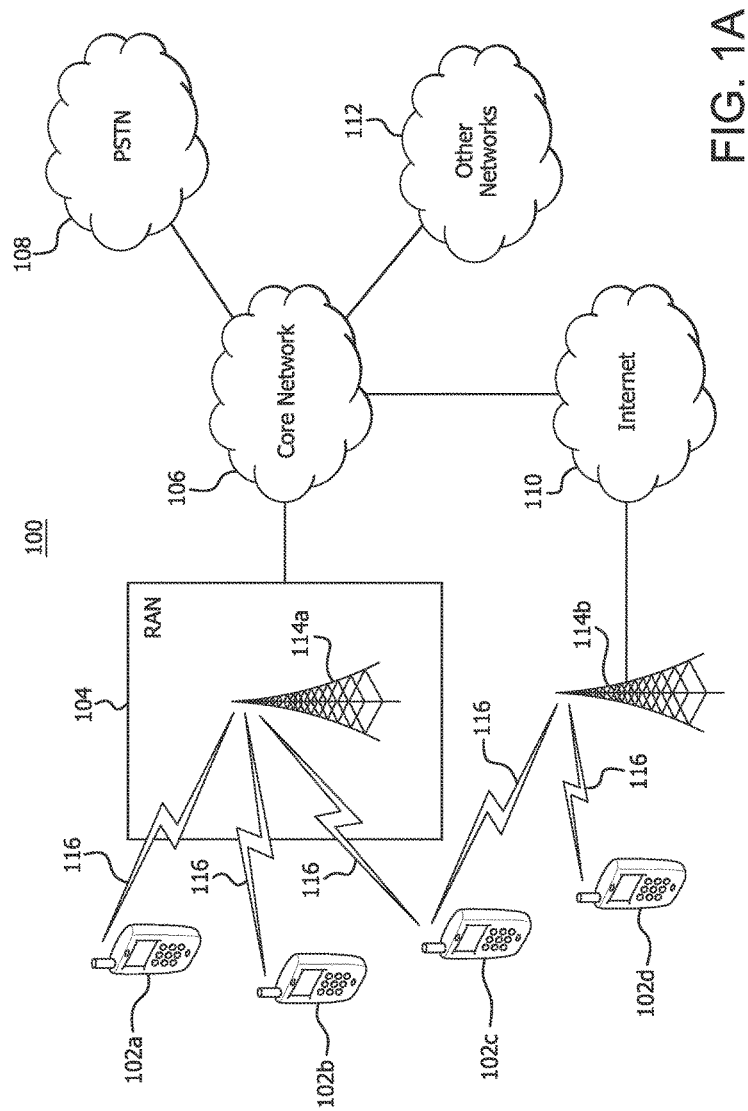
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a radio access network (RAN) 104, a core network 106, a public switched telephone network (PSTN) 108, the Internet 110, and other networks 112, though it may be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it may be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1x, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it may be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
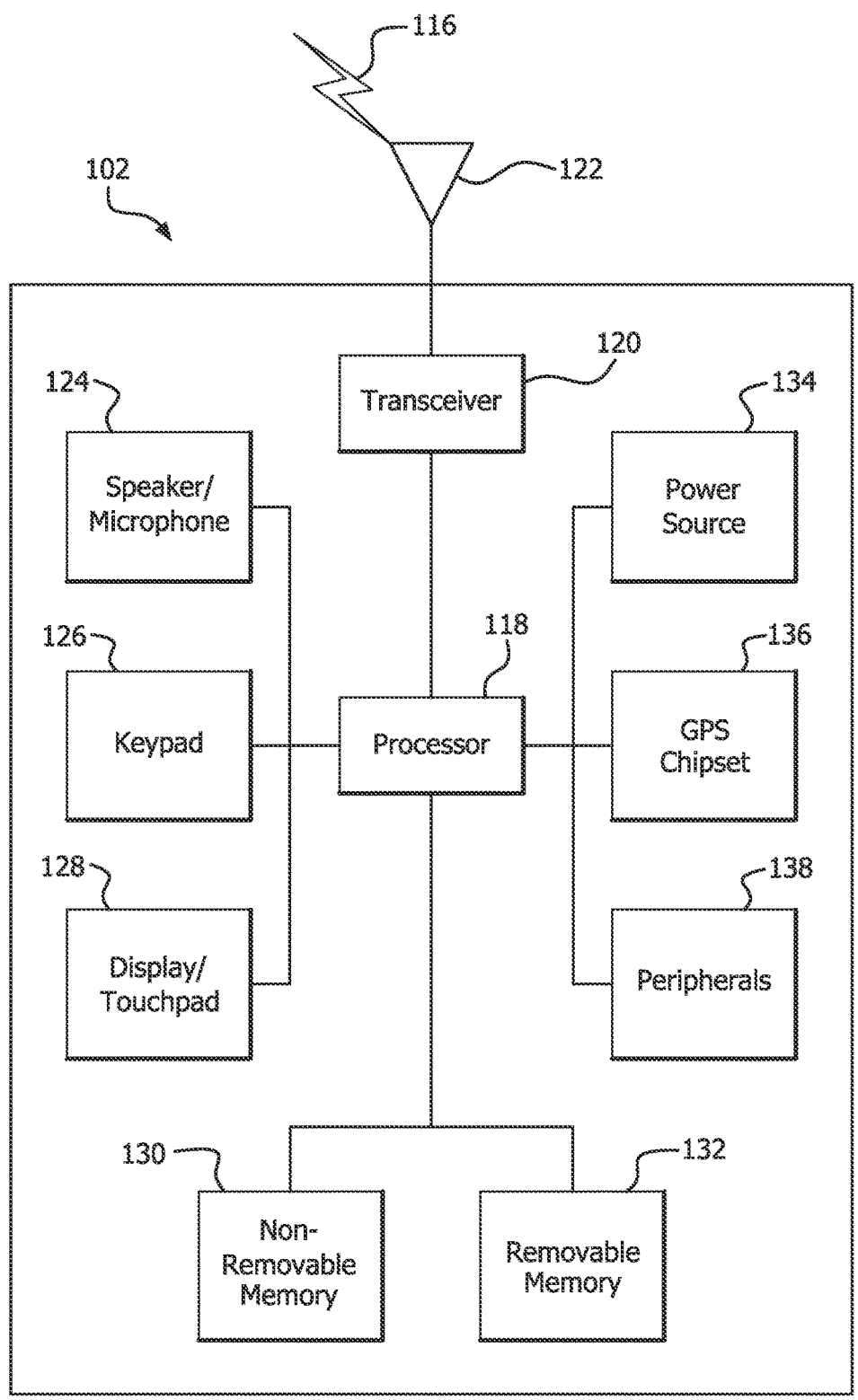
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It may be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
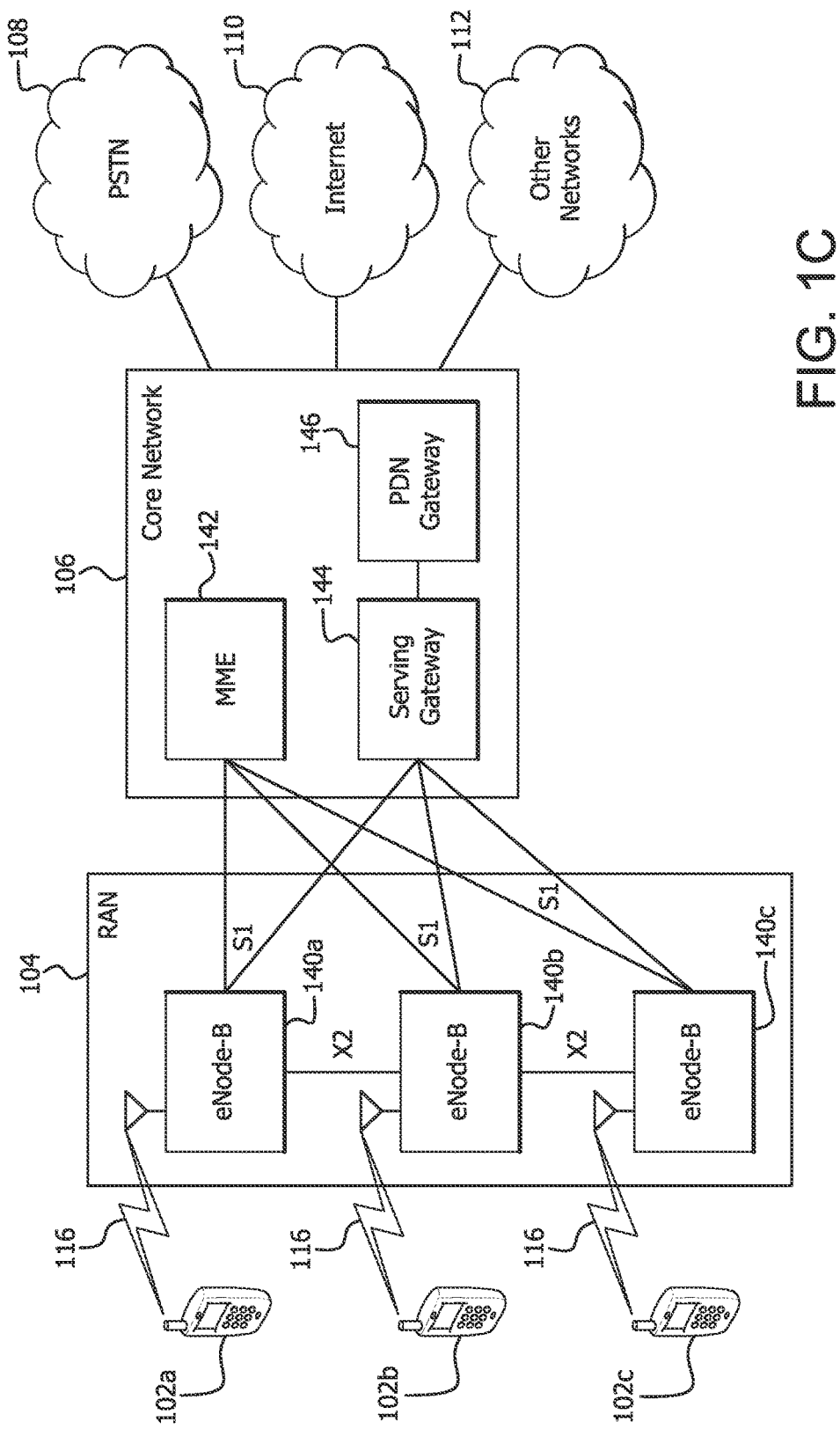
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the core network 106.

The RAN 104 may include eNBs 140a, 140b, 140c, though it may be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 1C, the eNBs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it may be appreciated that any one of these elements may be owned and/or operated by an entity other than the core network operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Currently in the third generation partnership project (3GPP) system architecture working group 1 (SA1), there is an effort underway to study possible cases that may cause user plane congestion and solutions to alleviate the congestion. Congestion may occur at the RAN level, or at the interface between the RAN and the CN nodes that manage the user plane, (for example, the eNB-SGW interface realized with S1-U).

Figure 2:
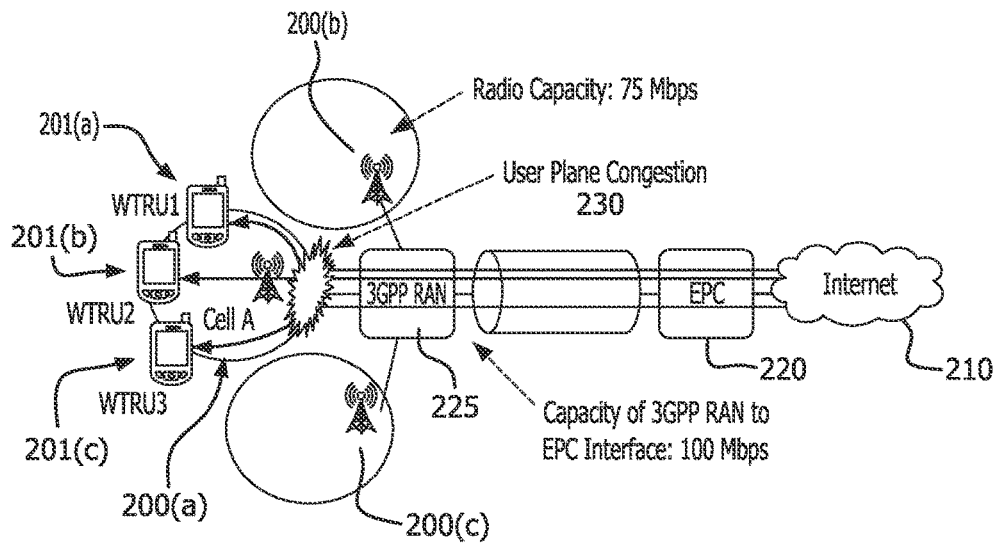
FIG. 2 shows an example of user plane congestion due to full use of cell capacity.

FIG. 2 shows an example of congestion at the RAN level for one cell. As illustrated in FIG. 2 there may be three WTRUs 201(a), 201(b), and 201(c) located in Cell A 200 that are trying to retrieve information from the Internet 210. The information travels from the Internet 210 through the Evolved Packet Core (EPC) 220 and through the 3GPP RAN 225 to reach the WTRUs 201(a), 201(b), and 201(c) in Cell A 200(a). There may also be two additional cells 200(b) and 200(c). Each cell 200(a), 200(b), and 200(c) has a radio capacity of 75 Mbps. The capacity of the 3GPP RAN 225 to EPC 220 interface is 100 Mbps. When a number of WTRUs 201(a) and 201(b) have user plane traffic totaling the cell 200 capacity (75 Mbps), and an additional WTRU 201(c) wants to transmit user plane traffic, congestion 230 may occur. This may be because the traffic volume exceeds the capacity (75 Mbps) of the cell 200.

Figure 3:
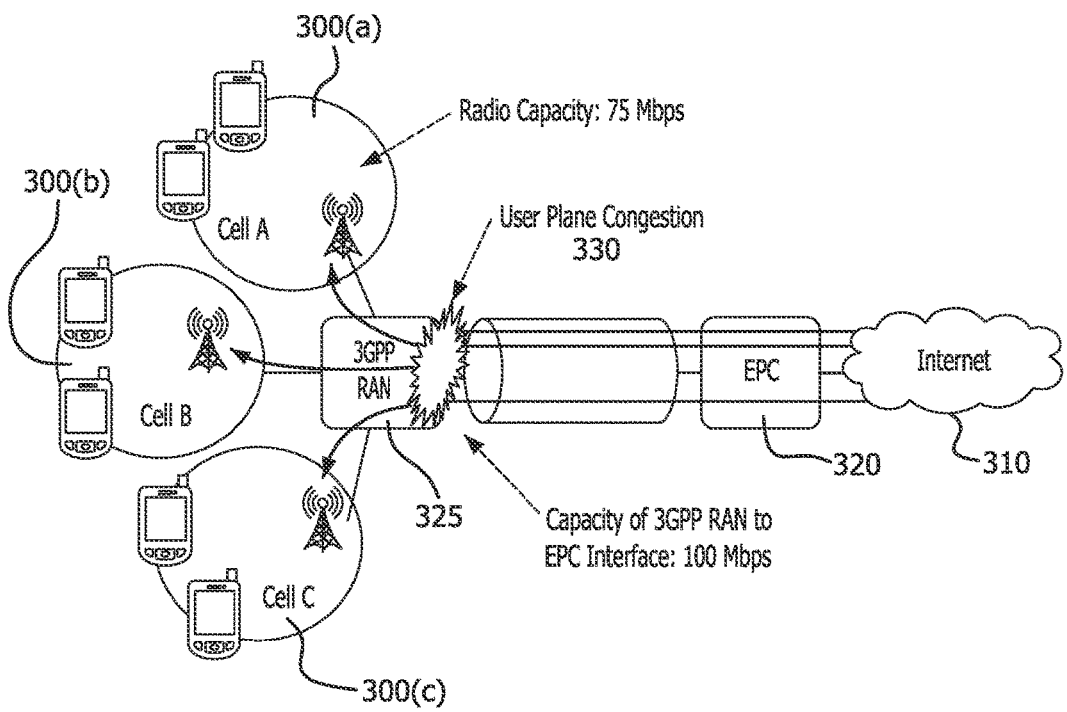
FIG. 3 shows an example of user plane congestion due to a third generation partnership project (3GPP) radio access network (RAN) to evolved packet core (EPC) interface capacity limitation.

FIG. 3 shows congestion at the S1-U level. As illustrated in FIG. 3 there may be three cells, for example, Cell A 300(a), Cell B 300(b), and Cell C 300(c), trying to retrieve information from the Internet 310. The information travels from the Internet 310 through the EPC 220 and through the 3GPP RAN 325 to reach each cell 300(a), 300(b), and 300(c). Each cell 300(a), 300(b), and 300(c) has a capacity of 75 Mbps. The capacity of the 3GPP RAN 325 to EPC 320 interface is 100 Mbps. When the user plane data volume of all the WTRUs being served by Cells A 300(a), B 300(b) and C 300(c) totals more than the actual capacity of the 3GPP RAN 325 to EPC 320 interface (100 Mbps), there may be a potential impact on all the WTRUs involved. This may lead to excessive data rate reduction or service denial. Even though each cell 300(a), 300(b), and 300(c) may have the necessary capacity to support the WTRUs it is serving, the capacity of the 3GPP RAN 325 to EPC 320 interface (100 Mbps) may have an impact on each WTRU and may in the worst case actually prevent the WTRUs from being offered any capacity at all.

When congestion occurs, the network may detect congestion in order to apply a solution to reduce congestion.

Some high level requirements are being investigated for reduction of user plane congestion. For example, the network may be able to identify, differentiate and prioritize different applications based on the QoS attributes of their communications. According to operator policies, during RAN congestion the operator may be able to select the communications which require preferential treatment and allocate sufficient resources for such communications in order to provide these services with appropriate service quality. The network may provide mechanisms to detect RAN congestion onset and abatement. The network may identify whether an active WTRU is in a user plane congested cell or not. The network may provide a mechanism whereby an application may be made aware of RAN congestion status.

According to operator policies, the network may select specific users, (for example, heavy users, roaming users, and the like), and adjust the QoS of existing connections or the application of relevant policies for new connections, depending on the RAN congestion status and the subscriber's profile. The network may configure such RAN congestion-based policy rules.

When RAN user plane congestion occurs per operator policies, the network may subject traffic to compression, (for example, compressing hypertext transfer protocol (HTTP) 1.1 Web content into gzip format, transcoding a 16 bit tagged image file format (TIFF) image into an 8 bit TIFF image), taking into account WTRU capabilities in order to optimize traffic delivery to relieve RAN user plane congestion.

The WTRU may inform the network when a request for a data connection establishment/reactivation is for unattended data traffic or attended data traffic.

The network may prohibit or delay all or a particular selection of requests for data connection establishments/reactivations for unattended data traffic from that WTRU. The network may identify, differentiate and prioritize different applications with similar QoS attributes, such as social networking, video, blog, internet games, file transfer protocol (FTP), software patches and updates, operator ownership, and the like. The network may force a renegotiation of the voice/video call to a lower bit rate and may be able to restore the original higher bit rate upon RAN congestion abatement. The network may provide a mechanism to support different charging policy based on RAN congestion status. The network may enable the protocol optimization capability to reduce the number of interactions between the WTRU and the network.

The requirements listed above may be enabled within 3GPP. Therefore, there may be a need to come up with procedures and/or signaling to realize these requirements so that they may be put into effect.

There is currently no mechanism for the network to classify certain subscribers as users that may have paid an extra premium so that a satisfactory level of service may still be enjoyed despite congestion. For example, the network may allow different levels of subscriptions and each may have different implications to user experience when congestion occurs. Consequently, there are no mechanisms for the RAN to revert back to normal services when congestion terminates. Nodes, such as evolved Node-Bs (eNBs), may be the only nodes involved in responding to congestion level changes. These nodes may not have such capability or functionality to modify their behavior due to indication from other parts of the network. Thus, there is a lack of congestion related information exchange between core network nodes, (for example, MME or PDN GW), and the eNB.

There is currently no mechanism available for the network (RAN or CN) to inform the WTRU about congestion in the network such that certain applications or traffic type may not be allowed, even though other types of application, (for example, those that may not require high QoS resources), may be handled by the system. Currently, the network may inform the WTRU that the network is congested and this may simply lead the WTRU to not access the system even for services that require minimal QoS. Moreover, the network may inform the WTRU to take certain actions, or the mere indication from the network may lead the WTRU to execute certain procedures that may reduce the congestion in the network. Such behavior may not be supported by the network.

In relation to WTRU-awareness of congestion, there may also be no user awareness of network congestion. This may be useful as the user may prefer certain applications over others and hence the WTRU may reflect user preference to the network so that certain traffic may be allowed when sacrifices need to be made, For example, the WTRU may reflect user preference in the form of providing a limited QoS or supporting a subset of applications only.

The network may perform congestion control by identifying user plane traffic. In current networks, the eNB/MME may include WTRU contexts and bearers that are assigned unique IDs related to the WTRU contexts. Thus, the network may identify the traffic on a per WTRU basis or, more specifically, on a per bearer basis. However, the RAN and EPC may not be aware of the applications or the content types carried over the bearers. Although QoS class identifier (QCI) values may be associated with certain kinds of traffic, they may not provide fine granularity for congestion control. Moreover, different applications or content types may run on the same bearer, (for example, the default bearer), which may make it more difficult for the network to identify the applications or the content types of the user plane traffic. Therefore, methods may be needed in the eNB and other network nodes to identify different types of traffic transmitted on the Uu interface.

Further, the WTRU or the core network may assist in determining the type of traffic which is causing congestion. The WTRU assistance information may enable different network elements to identify different traffic patterns and flows. This may enable the network to identify what kind of traffic is causing congestion issues in the network, allowing the network to take appropriate action. Therefore, a determination of the kind of WTRU assistance information that may be needed to mitigate the congestion situation may be necessary.

In a RAN sharing scheme, one mobile virtual network operator (MVNO) may be given a part of the RAN resource, and the congestion may occur only for that particular MVNO, but not for the entire network. The eNB may be able to detect such partial congestions.

Current load measurements may not distinguish the load from applications or content from different users in the network, and the current X2 load exchange method may also not distinguish the traffic from different applications. In the current load balance procedure, when a cell is congested, it may exchange its load information with its neighbor cells. The load balance algorithm may choose a cell without overload condition and offload the traffic from the overloaded cell to non-overloaded cell(s) by adjusting their handover parameters. The current load balancing method may not distinguish the type of traffic when it offloads traffic from overloaded cells to non-overloaded cells.

In the case of a congested RAN, the operators may want to offload some specific load to a different eNB. Therefore the load chosen to be offloaded may be different toward different eNBs based on their usage traffic/flow characteristic. To support traffic specific load balance, a new method may be implemented to measure the RAN traffic on an application/content basis. The application/content specific load measurement may be used in determine the load condition on the traffic from each application. The application/content specific load measurement may also be used to determine which applications overload the network and need to be offloaded.

The current load information exchange procedure may also be enhanced to include application specific traffic in the X2 load update message. The load exchange message may be used to determine application traffic that may need to be offloaded and how much traffic from each eNB may be offloaded from an overloaded cell. The load exchange message may also be used to determine how much traffic from each eNB an un-overloaded cell may take from the overloaded cells.

The current load balancing action may modify cell mobility parameters by negotiating handover trigger settings with a peer eNB controlling neighboring cells. The change on the handover trigger settings may change the cell coverage for the connected mode WTRUs and therefore change the cell's load. To support application/content specific offloading, the current X2 message for negotiating the handover trigger settings may be enhanced to support application/content specific handover settings. With the application/content specific handover settings, the cell may have different coverage for each application and may therefore specifically adjust its load on a specific eNB.

Additional subscription parameters may be used to provide a satisfactory level of service to subscribed users despite congestion at the network (RAN or CN). The subscription information may be for different service experience levels such that each level may provide the user with a better service experience than non-subscribed users. Yet, there may be different priority levels for the subscribed users. For example, a "Level 1", "Level 2," "Level 3", and the like, subscription may be defined where "Level 1" may provide the best possible service during congestion, "Level 2" may provide a satisfactory service during congestion but the service experience is not as good as that of "Level 1", while "Level 3" may provide a fairly good treatment despite congestion. Each level may be associated to a specific service or preferential treatments, where "Level 1" may encapsulate all the treatments in both "Level 2" and "Level 3".

A home subscriber server (HSS) may provide such subscription information to the MME or any other node that is fetching the WTRU's subscription information, (for example, serving general packet radio service (GPRS) support node (SGSN), mobile switching center (MSC), and the like). In addition, the MME, (or any other node with similar functionality, for example, the SGSN), may forward such information to the rest of the core network nodes such as the serving gateway (SGW) and/or the packet data network (PDN) gateway (PDN GW). Also, the MME may forward this information to the eNB. The source eNB may also transmit this information to a target eNB during the S1 or X2 handover procedure; this may ensure that the WTRU receives the same treatment for congestion situations in both the source and target eNBs.

It may also be possible that an eNB or a "well known app-info" database may have a direct interface to the HSS or WTRU subscription. If this is the case, then the eNB or the "well known app-info" database may directly query the HSS for the subscription package of the WTRU.

Core network (for example, MME) and RAN (such as an eNB) procedures for the purpose of solving and/or avoiding user plane congestion may be described herein.

An MME to RAN indication about WTRU subjectivity to user plane congestion may be used. An MME may inform the eNB whether or not a WTRU may be subject to user plane congestion mitigation. This may be based on the WTRU's subscription information defined above. The MME may provide an indication to inform the RAN (for example, the eNB) that a specific WTRU is a prioritized user and may have the least impact to service experience, a prioritized user and may have a specific reduction in QoS when congestion is detected, or a non-prioritized user and may have a specific reduction in QoS when congestion is detected, or no user plane activity at all, and the like.

The MME may indicate the level of subscription that the user has and, as a result, the level of delay tolerance or reduction in QoS (or QCI) that the user may experience when congestion at the RAN is detected. The MME may forward the subscription information to the eNB, or the MME may forward other indications that are based on the subscription information of the user/WTRU.

As an example, a new information element (IE) or bitmap may be defined where the value of the IE or bitmap indicates that the user/WTRU has "Level 1", or "Level 2", or "Level 3" subscription, (as previously described). The different subscription levels may have different implications or handling at the eNB when congestion occurs. For example, a subscription level of "Level 1" may imply that bit rate for a particular user may not be affected, or may be affected the least, or may be affected by a well-known percentage (for example, 20% reduction) when congestion is detected.

As another example, a congestion level of "Level 3" may imply a reduction of bit rate by 50% (as an example) when congestion is detected at the RAN. Thus, the eNB may be configured with information such that each subscription level may lead to a specific handling by the eNB when user plane congestion is detected.

Further, the MME may indicate, (optionally in addition to the indications above), whether a WTRU/user is a roaming WTRU. The eNB may use this indication to reduce the prioritization of the WTRU's bit rate or to degrade the WTRU's bit rate when congestion is detected. However, a roaming WTRU may not necessarily imply that the WTRU's data rate may be reduced, as the user may have already paid for a prioritized service, even during roaming. In this case, the MME may also indicate if the roaming WTRU is to receive some form of priority treatment when congestion is detected, and optionally the level of priority treatment that may be applied for the roaming WTRU.

All of the indications described above may be included in any S1AP message such as (but not limited to) a WTRU Context Setup Request, WTRU Context Modification Request, and the like.

A new S1AP procedure on the S1-C interface may indicate the start and end of congestion at the RAN. The eNB may inform the CN (for example, the MME) that the cell is experiencing congestion. A new procedure/message may be defined, (for example, a Congestion Status Indication) may be defined for this purpose. An existing message may also be used, rather than a new message. The eNB may transmit a Congestion Status Indication when the eNB detects congestion. The eNB may also indicate the cell identity and/or the cell global identity so that the MME knows exactly which cell/eNB is transmitting the Congestion Status Indication message.

The eNB may detect (or declare) congestion by monitoring the total number of bearers that provide a specific QoS or QCI. The eNB may also detect congestion by monitoring the total bit rate that is provided to all WTRUs in the cell. The eNB may also detect congestion by monitoring other user plane parameters (for example, QoS or QCI) to check if a certain threshold has been exceeded.

The eNB may also detect (or declare) congestion when the eNB serves a certain number of WTRUs that have prioritized subscription as defined above. This is because having prioritized subscription may imply high bit rate or may guarantee service. This may translate to potential congestion as the eNB strives to provide this quality of service.

The eNB may also provide feedback, (for example, total number of WTRUs, total number of bearers and the associated QoS, and the like), to other operation and maintenance (O&M) nodes in the network. The O&M nodes may indicate to the eNB that congestion may be declared. The O&M nodes may be part of the eNB function, or may be another logical entity in the network.

The eNB may transmit the message to the MME and may indicate some parameters to inform the MME about the level of congestion. The message transmitted to the MME may be one that is not specific to any WTRU and may simply inform the MME about the detection of congestion in the cell. The methods described herein may also apply to a HeNB and/or a HeNB GW.

The eNB may also include the proposed indication in other S1AP messages even if they may be specific to a WTRU. However, the indication may still be on the cell level, such as, to indicate that congestion has been detected (or congestion has terminated) in the cell. For example, the eNB may transmit such an indication in the Initial WTRU Message as a new information element. The MME may treat this IE as an indication that congestion in the cell is detected and it is not necessarily related to the WTRU for which the S1AP message is transmitted.

The same procedures described above may also be used to transmit an indication to the MME to inform it about congestion abatement or alleviation. Thus, when the eNB detects that congestion is alleviated, (for example, total bit rate in cell falls below a certain threshold, total number of WTRUs with prioritized service falls below a certain threshold, and the like), the eNB may transmit an indication to the MME to notify it about the termination of congestion. Similarly, the Congestion Status Indication message or any other existing message may be used to do so.

A new S1AP procedure/message (or a modified existing message) may be described herein to inform the RAN to start user plane congestion mitigation by enabling the MME to inform the RAN nodes that user plane congestion avoidance/mitigation/resolution may be started. The MME may receive user plane activity level reports from a set of eNBs such that the S1-U connection towards the SGW may start to get congested, for example, as shown in FIG. 3. Thus, the MME need not wait until every cell is congested before it requests a particular eNB to start taking measures to avoid or solve user plane congestion problems.

A new message, for example, a Congestion Management Request, may be defined for this purpose. Alternatively, the message proposed above may also be used by the MME. Furthermore, any existing S1AP message may also be used by the MME. Even if the message is used for a particular WTRU, the MME may still include an IE to indicate that the eNB may start taking measures to avoid or alleviate user plane congestion.

The MME may also include a cause code to indicate that the request is due to congestion in the S1 interface towards a serving GW. This may be useful for the eNB to know as the eNB may take certain actions in other scenarios that may be useful but may be harmful in this case. For example, if there is congestion in a cell and not on the S1 interface from all cells, an eNB may choose to handover or redirect a WTRU to another neighboring cell where congestion at that cell is not a problem. However, if congestion is occurring on the S1 interface due to a user plane from all cells, the eNB may not handoff or redirect the WTRU to another cell since the problem may still exist from that cell.

The MME may, based on other reasons or knowledge of cell level congestion, request the eNB to handoff or redirect certain WTRUs to other neighboring cells. The message may also be used for this purpose or an existing message (for example, per WTRU S1AP) may also be used. The request from the MME may be on a per WTRU basis, or for any WTRUs that belong (or do not belong) to a specific prioritized user (as defined earlier), or for all WTRUs. The MME may also provide the eNB with a set of cells/eNBs that may be used for redirecting WTRUs, and a set of cells that may not be used for redirecting WTRUs as these cells/eNBs may be congested.

The MME may transmit the proposed message when the MME detects congestion in the RAN (at least one eNB) or on the S1-U interface that connects the RAN with the serving gateway (SGW). The SGW may also indicate to the MME that the S1-U interface is congested. The SGW may use a new or existing message on the S11 interface to communicate this event to the MME. The SGW may also indicate the set of eNBs that are causing the most congestion or the set of eNBs that have the highest user plane activity. The SGW may also provide some congestion related parameters or readings and may also do so per eNB. The SGW may also list the eNB in a specific order of decreasing (or increasing) user plane activity.

Upon reception of an indication that the S1-U interface is congested, the MME may transmit a request to at least one eNB to start user plane congestion abatement.

The eNB may detect congestion and may take any of the following actions, in any combination.

The eNB may downgrade the bit rate or QoS (or QCI) of a set of WTRUs based on their subscription information as provided by the MME (described earlier). The eNB may be configured with information about the level of degradation that may be applied for the different congestion levels and/or the different subscription level of the user.

The eNB may transmit a new radio resource control (RRC) message, (or a modified RRC message with a new IE), to the WTRU to indicate that the RAN is experiencing congestion. The indication may be on a cell level or may be for the tracking area or a set of indicated cells/eNBs.

The eNB may reconfigure existing data radio bearers (DRBs), (for example, by transmitting the RRC Connection Reconfiguration message with modified or new IEs), such that any of the following may occur. The QoS or QCI of the DRBs may be reduced as explained earlier and may also include a cause code to indicate that the reason is due to congestion. The eNB may deactivate a DRB and may also include a cause code to indicate that the reason is due to congestion. The eNB may hand the WTRU over to another cell or release/redirect the WTRU to another cell and may also include a cause code to indicate that the reason is due to congestion.

The eNB may start offloading WTRU traffic over non-3GPP access technology, for example WiFi access. At handover the source eNB may inform the target about WTRU's subscription or the MME may provide it to the target cell so that the right info may be used. The WTRU may also transmit that information to the network if the WTRU knows it. The eNB may release certain DRBs for the WTRU and may keep a set of DRBs only. The eNB may release a WTRU's connection, for example, if the WTRU does not have a premium subscription, for example a Level 1 or Level 2 subscription. The eNB may also provide an indication to back the WTRU off, optionally the indication may be for some type of traffic only, for example delay tolerant or low priority traffic.

The eNB/MME may inform the WTRU about RAN congestion. The WTRU may provide this information to upper layers or applications. The WTRU may install a new packet filter to force certain flows on the remaining bearers. The WTRU may only request certain QoS that is informed to the WTRU. The WTRU may start offloading traffic over non-3GPP access technology such as Wifi. The eNB may take such a decision and inform the WTRU to offload traffic (all or certain traffic) over non-3GPP access.

The eNB may transmit a new discontinuous reception (DRX) configuration to the WTRUs. This DRX configuration may be longer than the previous configuration which may cause the WTRUs to transmit data after a longer interval, reducing the overall load on the eNB.

The eNB may check if some of the active bearers are underutilized, for example, there may be less data transmission on some of the bearers for a particular WTRU, the eNB may decide to deactivate those bearers. When the eNB or the network deactivates those bearers, it may ask the WTRU or it may itself move the flows on those bearers to other active bearers.

The eNB may cancel or request the WTRU to cancel any reporting for minimization of drive test (MDT) purposes if it is activated at the WTRU.

It may be possible that the user plane of the network is congested but the control plane is not congested. In such a situation, the network may also use the control plane to transmit small packets or small data to different WTRUs.

The eNB may broadcast in system information blocks (SIBs) or any other broadcast method at certain times of the day when congestion may occur. These time periods may be based on past observation or the WTRU may receive an indication from the MME or any other CN node based on policies or observations from the operator.

The MME may detect congestion in the user plane, for example, based on reports from the RAN and/or SGW. The MME may then take any of the following actions, in any combination.

The MME may inform the RAN to start user plane congestion, (as explained earlier), for example, based on indication from the SGW about congestion on the S1-U interface.

The MME may verify the active users/WTRUs in a cell (optionally one which is congested) and based on the user profile and QoS/QCI, bit rate, application type, and the like, the MME may transmit a new non-access stratum (NAS) message (or a modified NAS message) to inform the WTRU about congestion in the RAN—at the cell level or at the tracking area level, and the like. In addition, the MME may indicate to the WTRU that certain bearers may not be supported in the RAN. The MME may transmit a list of bearers that may not have corresponding radio resources. However, the WTRU may not need to deactivate the NAS bearers and thus both the WTRU and the MME may keep the NAS bearers active, for example, may remain as part of the WTRU's context.

The MME may also modify the WTRU's bearers towards the SGW/PDN GW such that the corresponding bearers that may not be supported in the RAN may be unused, such as S1 bearers. The term "unused" may imply deactivated or may imply that the bearer context may be kept in the MME but no user plane activity may be allowed on them. The following may occur when user plane congestion is detected, for example, via O&M, or due to indication from the RAN or SGW, and the like.

The MME may request the SGW to render certain bearers unused. The MME may include a cause code or a new IE to indicate that the bearers may be rendered unused, optionally with a cause code that explains the reason being congestion at the RAN or S1 interface. Upon reception of a request to render certain bearers unused, the SGW may in turn request the PDN GW to also render the corresponding bearers unused. A new or existing message may be used to do so. For example, the SGW may transmit a Modify Bearer Request message to the PDN GW and include new IEs to indicate the request and also specify the bearers that may be rendered unused. The PDN GW may then render the bearers unused, for example, the PDN GW may deactivate the bearers or stop transmitting downlink packets on these bearers.

The MME/SGW may also inform the PDN GW to stop transmitting any downlink packets for a set of bearers. The bearers may be maintained between the SGW and the PDN GW, however, the PDN GW may discard any packets on the indicated bearers since no S1 and/or radio bearers may exist for these S5 bearers.

The MME may do so by defining a new message towards the SGW or by modifying an existing message, for example, the Modify Bearer Request message that is transmitted from the MME to the SGW. The MME may include a new cause code to indicate that this modification (for example, to render the bearer(s) unused) is due to user plane congestion, optionally per cell or service area level. The SGW may also forward the message towards the PDN GW.

The network (MME or PDN GW) may be configured with policies such that user plane congestion may trigger the modification of bearers such that at least one bearer is not rendered unused and as a result, the flows from other bearers may be forced to go over the remaining bearer by installing or modifying new packet filters in both the WTRU and the network. For example, the PDN GW may choose to keep one bearer active out of, say for example, four bearers. The network may choose to keep a specific bearer active because it may be able to provide the associated QoS given the congestion in the network. The network (MME and/or PDN GW) may modify the packet filters in the network and the WTRU so that all data intended to be carried on all available bearers may make use of only the bearer that is kept active so that this bearer may serve the data that was being used over the other three bearers. To do so, the network may initiate a session management procedure, for example, a Modify EPS Bearer Context Request (NAS message), to modify the packet filters such that all of the WTRU's IP flows are transmitted over the bearer(s) that is/are kept active, such as, not rendered unused.

The MME may transmit a new or existing NAS message to the WTRU to indicate that there is currently user plane congestion in the cell, tracking area, or network, and the like. This may be done by defining a new NAS message or using an existing but modified NAS message, (mobility or session management message). The MME may include a new cause code to indicate user plane congestion to the WTRU. The MME may also indicate in the message that the WTRU may render certain bearers unused and optionally keep at least one bearer active. The MME may also indicate to the WTRU that the WTRU may use the active bearer(s) for all or a sub-set of the IP flows that transmitted over other bearers. The WTRU may then initiate a NAS procedure to modify its packet filters such that all, or a subset of, its IP traffic (that was transmitted over other bearers) may now be transmitted over the bearer(s) that is kept active in the network (both uplink and downlink packet filters in the WTRU and the network respectively may be modified, for example, as per indication from the MME). The WTRU may keep an indication that specifies that the network is under user plane congestion or that specifies that the WTRU is operating in a way that is not optimal, for example, certain bearers rendered unused. The MME may also keep such an indication per WTRU so that the MME may take necessary actions when user plane congestion is terminated.

The MME, or network (such as an eNB), may be configured with policies to keep the data rate of one WTRU below a certain threshold when user plane congestion is detected. Alternatively, the MME may be configured with policies to allow WTRUs to have a certain number N (where N is a configurable integer) applications running when congestion is detected. Thus, the MME may transmit a request/indication to the WTRU to notify of the maximum bit rate that is allowed to be transmitted by the WTRU, for example, regardless of bearer or application that uses this limit. The MME may optionally indicate to the WTRU to render some bearers unused and may also indicate a limit for the usage of at least one bearer that is kept active. The MME may indicate to the WTRU that a specific number N of applications may be allowed for a signaled time or until further indication to do otherwise from the network.

The MME may include details about the bit rate that is allowed per application. The application types and other details of the data running in these applications may be obtained from an Application Detection Function which may be located in any node such as the PDN GW or may be connected to the PDN GW or MME (if possible). The WTRU may then display to the user to choose a specific number N of applications that the user wishes to keep amongst the set of all applications that are currently running in the WTRU. The WTRU may indicate that the reason for doing this is due to congestion in the network. Alternatively, the WTRU may be preconfigured with priority information (for example, by the user or operator, access network discovery and selection function (ANDSF), and the like), regarding the set of applications that may be kept active when user plane congestion is detected. The WTRU may then also limit its data rate (optionally for all running applications) to the data rate limit that is signaled by the network.

The WTRU may transmit an indication to the network with a list of applications that may be kept based on the user choice or WTRU information. The network (MME or eNB, and the like) may also transmit an indication to SGW/PDN GW to indicate which applications or flows may be left active and which applications (and hence IP flows) may be rendered unused.

The MME may transmit a NAS indication to the WTRU to inform it that the network is congested or is expected to be congested in a particular time and/or location. The network may be aware of certain events that are scheduled to take place at a particular time and/or location. Hence, based on the time and/or location of the WTRU (for example, if the WTRU is in the known location around the time of the scheduled event), the network may then transmit an indication to the WTRU to expect degradation in user plane quality of service.

The MME may include these indications in any NAS message, new or existing. Similarly, the MME may also inform the RAN to start applying congestion mitigation at a specific time. Such indication may be included in any S1AP message towards the RAN. The MME may transmit a NAS message to the WTRU to request the WTRU to run a minimum number of applications M, where M is an integer. The PDN GW or other nodes in the network may be able to know the number and type of applications that are running in the WTRU, for example, using deep packet inspection, amongst other ways. Thus, the MME may be informed about the number and type of applications that are being run in a WTRU. Upon congestion, the MME (as an example) may use such information and request the WTRU to select M applications out of all applications that are being run in the WTRU. The choice of the integer M may be an MME decision or may be a decision taken by another node, for example, the PDN GW or an application detection function.

The MME may inform the PDN GW or the charging entities in the network about congestion status, for example, started or ended. The MME may do so in relation to a particular WTRU such that the charging scheme may be varied depending on the congestion status and the WTRU subscription. For example, a WTRU that has "Level 1" subscription may be charged more when provided with good quality of service in spite of congestion. The MME may take similar actions above to inform a particular entity, (for example, RAN, WTRU, PDN GW, SGW, charging entities, and the like), about termination of congestion so that the normal treatment applies. For example, after congestion is terminated, the MME may inform the WTRU about it so that all bearers that may have been rendered unused, may be reused as normal. The WTRU may also, for example, modify its packet filters according to normal behavior rather than, for example, modifying packet filters to force all IP flows on one bearer that may have been kept active because of user plane congestion.

The WTRU may take any of the following actions, optionally based on detection of congestion in the network. WTRU detection of network (such as a RAN) congestion may be realized by the reception of explicit indications from the network (for example, RRC and/or NAS messages, ANDSF, Open Mobile Alliance (OMA) device management (DM), and the like), or may be due to WTRU observations, for example, (but not limited to) a decrease in user plane quality of service, or a rejection of WTRU requests to establish a bearer with a specific QoS, and the like.

The WTRU may be configured to use a certain number of bearers N, where N is an integer. The WTRU may use the bearer as if it is configured with a well-known QoS even if this QoS is not the same (for example, it may be worse) as the actual QoS that was associated with this bearer upon its activation. The WTRU may be told the quality of service that may be used for each of the N bearers (where N is an integer and may be one). The WTRU may use only the default bearer and may as well be informed about (or configured with) the QoS, (which may be worse than the actual QoS associated with the default bearer upon its activation).

The WTRU may override its packet filter rules such that data from the applications that are running in the WTRU may still be transmitted on the bearers that are active in the WTRU, even if these bearers were not used for the applications. The WTRU may modify its bearers to modify or install new packet filters such that data from all active applications in the WTRU are transmitted over the remaining active bearers in the WTRU. This may be done by using the NAS session management messages, for example, a Bearer Resource Modification Request. The WTRU may transmit a new cause code to indicate that the reason is due to detected network congestion.

The WTRU may display a notification to the user to inform the user that there is RAN congestion, or to inform the user that the quality of service may be degraded due to network congestion. The WTRU may be configured to select a set of applications amongst all the application that are running. This may be based on a priority in the WTRU. For example, a voice application may have higher priority than an email or FTP application. Such policies or rules may be configured by the user (such as on a real time basis, such as after the WTRU display to the user to select a set of applications to keep running due to congestion), or by the operator (such as via ANDSF, OMA DM, and the like). For example, the operator may have an agreement with service providers that pay a certain fee to prioritize their application(s) over other application(s) when congestion exists in the network.

The WTRU may stop transmitting requests for user plane, optionally for a specific QoS or QCI. The WTRU may display unavailability of certain requests for specific QoS due to congestion. The WTRU may be informed or configured with a specific time during which it may not transmit such requests.

The WTRU and network (MME, eNB, SGW and the like) may take similar actions to revert back to normal operation after congestion mitigation actions are executed. For example, after congestion terminates, the eNB may inform the MME and the WTRUs about it. The eNB/MME may then improve the WTRUs' quality of services and may allow the WTRU or inform the WTRU to use all the bearers that were established before congestion was detected. The WTRU may be informed (using the mechanisms proposed in this document) about termination of congestion via same methods used to indicate congestion start. The charging system may also be informed about congestion termination so that normal charging rates are applied. Thus, the same mechanism and procedures used to signal and mitigate congestion may also be used, (for example, with opposite actions or indications to improve the user experience or quality of service at every node in the system), when congestion terminates.

The RAN may inform the CN that congestion has occurred; the CN may then inform the PDN GW so that the PDN GW may inform application providers that certain push services may be delayed.

The WTRU may indicate to the MME if a NAS message such as an Extended Service Request or any other session or mobility management message is triggered by the user or by the applications (for example, without user interaction). Thus, the WTRU may include this indication in all NAS messages.

Critical health applications may always cause establishment cause to be "emergency" or other new establishment causes that reflect high priority data.

Operator based applications may use a specific establishment cause or may use other aspects that implement higher priority. The WTRU may indicate that the WTRU is transmitting a request for operator based services in any NAS message, for example, a (Extended) Service Request, or any other session and/or mobility management messages.

Although there may be millions of applications running in the system, only a few popular applications get large penetrations among mobile users. Web browsing, VoIP, online video, and social applications are a few examples of these popular applications. In the first place, these applications are important to the user experience and they may be guaranteed the resource when possible. Secondly, these applications take up most of resources and are the main contributors to the user plane congestion, so they may be subject to the congestion control when the user plane congestion occurs. It is important for the system to be aware of the specific applications to which user plane traffic belongs, and based on this application-awareness, the congestion detection and control policies based on applications are possible.

To enable the application-awareness in the system, a "Well-known App Info Database" may be configured at various system nodes. The database may be configured at the nodes where deep packet inspection (DPI) may be performed to ascertain the application type of the packets, for example, the P-GW, S-GW or GGSN, SGSN. The database may also be configured at the RAN nodes, for example, eNB, HeNB, RN, Node-B, and RNC. The databases at various nodes in the same system may be identical.

The "Well-known App Info Database" may be composed of the multiple entries of the well-known applications; the content of each entry may include a unique "Application ID" assigned to the application. The App ID space and assignment may be managed by individual operators, or it may be standardized in the industry or per operating system. The information that may be used to differentiate a specific application from other applications may include the app server IP address, the TCP/UDP ports or ports range, the QoS characteristics of the application, such as bursty or non-bursty, latency sensitive or not, and other auxiliary information, such as the application name, the application provider information, the popularity. The same application may have multiple entries in the database and may have different application IDs for different content. For example, for a VoIP application, the signaling and the media streams may be assigned two different application IDs. The databases at various nodes may be locally configured by the O&M. If the node has an interface to the policy and charging rules function (PCRF), it may also be dynamically updated by the PCRF which may get the application information from an application function (AF) via a receiver (Rx) interface.

Figure 4:
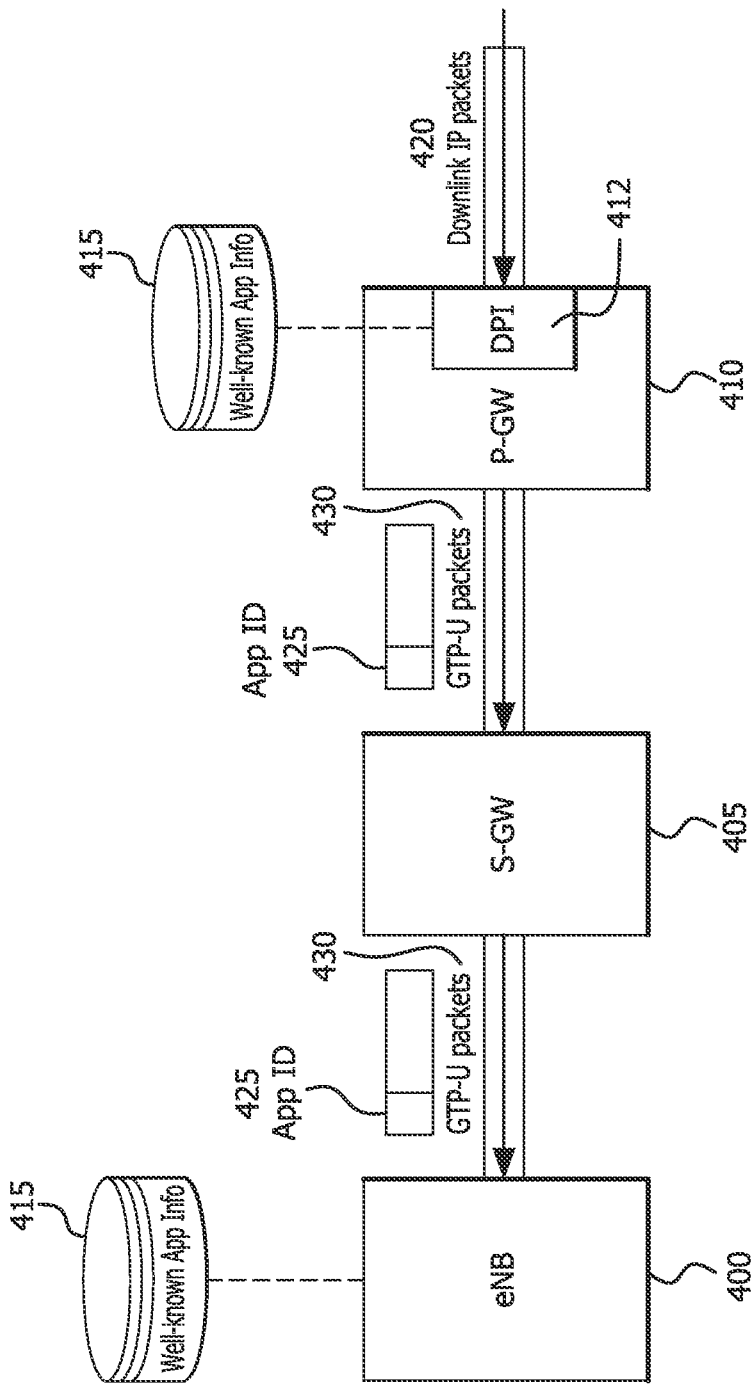
FIG. 4 shows an example of application detection based on an application identifier (ID).

FIG. 4 shows an example of application detection based on an application identifier (ID). Downlink IP packets 420 may be received at the P-GW 410. The P-GW 410 may utilize the Well-Known App Info Database 415 to determine whether any of the downlink IP packets 420 correspond to a well-known app using DPI 412. If any of the downlink IP packets 420 correspond to a well-known app, the P-GW 410 associates an App ID 425 to those packets when transmitting the GPRS tunneling protocol user plane (GTP-U) packets 430 to the S-GW 405. The S-GW forwards the GTP-U packets 430 with the App ID 425 to the eNB 400. The eNB 400 utilizes the Well-Known App Info Database 415 to determine which data receives priority and if congestion occurs. The Well-Known App Info Database 415 may be populated based on user frequency or user preference.

At the nodes where DPI 412 may be performed for downlink data packets 420, for example in the P-GW 410, the nodes may also look up the "Well-known App Info Database" 415 and try to match the downlink data packets 420 to a well-known application, and if a match can be found, the "Application ID" 425 may be inserted in the packets 430 to propagate the application awareness to the downstream nodes, for example in the eNB 400.

The application mapping procedure may be independent of the bearer binding process which also uses the DPI function. Different App IDs may be applied to the packets that have been mapped to the same bearer. After a well-known application is detected, the unique App ID may be inserted in the GTP-U packets to propagate the application awareness.

To carry the App ID info in the GTP-U packets, a new "App ID" field may be added in the GTP-U header as an extension. Alternatively, some existing optional field in the GTP-U header may be used for the App ID, or a differentiated services code point (DSCP) in the IP header may be used for the App ID.

Alternatively, the "Well-known App Info Database" may be configured in the WTRU, for example, by an OMA DM, ANDSF or similar procedure.

The load measurement on a per application/content basis may include the eNB or the RAN node to measure some new parameters to accurately know amount of traffic data transmitted by the eNB on a per application basis. A network management system (NMS) (may be a logical entity in the RAN or CN) may configure the RAN node to monitor and report the traffic of the specific applications.

The NMS may indicate which one or a few applications, identified by App IDs, to be monitored, and which quantities may be calculated and reported by the RAN node. The quantities may include the aggregate traffic volume/data rates of a specific application, the percentage of the aggregate traffic volume/data rates of a specific application to the whole traffic volume/data rates in the RAN node, or the air interface resource (for example, percentage of scheduled physical resource block (PRB)) usage by the data of a specific application. The eNB may measure the PRB usage per application or content during a certain measurement time period T. This measurement result may indicate a percentage PRB usage for a particular application data running on the eNB. When this percentage reaches a certain threshold, when the eNB is congested, it may trigger offload of a particular application.

The quantities may further include the number of scheduling request received by the eNB for a particular type of application. This may be measured when the WTRU transmits a scheduling request (SR) and then the eNB may check the type of application data which follows when the grant is received by the WTRU. The WTRU may be asked by the eNB to report a buffer status report (BSR) on a per application basis, (for example, the granularity of the BSR may be increased such that the WTRU may report how much data per application it may have to report to the eNB).

The quantities may further include the number of active users that are using a specific application. The NMS may also configure the criteria for reporting application specific traffic statistics. For example, the RAN node may periodically report the application specific statistics, the RAN node may report the application specific statistics when it is above certain thresholds, the RAN node may report the application specific statistics when the user plane congestion occurs at RAN, or the RAN node may report the application specific statistics when it receives a command to do so. If the application specific traffic monitoring is configured and activated in the RAN node, the RAN node may check the App ID information in each downlink GTP-U packet, and calculate the above quantities, and report to the NMS as required.

The current load measurements may not distinguish the load from applications or content from different users in the network, and the current X2 load exchange method may not distinguish the traffic from different applications. Therefore, in order to support such application specific measurements, it may be necessary to support application specific load reporting. Therefore, cell load may be reported for at least one of the major applications running on the WTRUs in a particular cell. The eNB and other networks nodes may be able to differentiate between different applications running on the network.

The eNB may collect information about the PRBs being used per application. The eNB may use this information to offload traffic related to a particular type of application which may be causing a congestion situation at the eNB. The eNB may also report this information to the MME via an S1-AP message during an S1 handover or to the target eNB in a Resource Status Update or another similar X2 message during an X2 handover. This information may be reported on a per application basis and/or per public land mobile network (PLMN) basis in case the eNB is being shared by multiple operators. This procedure may be extended for measuring the backhaul load, for example, the load on the S1-U interface. The PDN-GW or eNB (there may be more than one eNB) may measure the amount of S1 resources being used by different applications and report it to the MME. The eNB or MME may use the "well know application" database to differentiate between different applications and accurately measure the load on the S1 connection.

After the eNB collects/receives application specific measurements and load parameters. It may trigger a handover procedure based on this information. It may need to offload WTRUs which are running certain types of applications to other eNB or RAT so that congestion may be alleviated in the source eNB. Currently load balancing action is through the modification of the cell mobility parameters by negotiating the handover trigger settings with a peer eNB controlling neighboring cells. The change on the handover trigger settings may change the cell coverage for the connected mode WTRUs and therefore change the cell's load. To support application/content specific offloading, the current X2 message for negotiating the handover trigger settings may need to be enhanced to support application/content specific handover settings. Only with the application/content specific handover settings, the cell may have different coverage for each application and therefore may specifically adjust it load on a specific eNB based on the in this information.

The handover trigger parameters may be negotiated with the peer eNB using the mobility settings procedure. An application based parameter may be added to the Handover Trigger Change IE in the MOBILITY CHANGE REQUEST message for each application that the operator may want to offload. This IE may be set in such a way that all the WTRUs which may be running that particular application triggers the source eNB to initiate a handover to the target eNB based on the value of this handover trigger IE in the case when the source eNB is congested.

The eNBs may be shared by different operators, for example, RAN sharing, in such a situation. To support conditions that the peer eNBs may be shared by different host operators, the operator information (PLMN) may be included in the Handover Trigger Change IE and the application based handover trigger. This may be achieved by adding both a host operator ID and an application-based Handover Trigger Change in the Mobility Parameters Information IE. In the case of an eNB2 reject, the Mobility Parameter for an eNB1 may transmit back the MOBILITY CHANGE FAILURE message. In the Failure message, eNB2 may indicate to the eNB1 that the eNB2 range of parameters that eNB2 may accept include Mobility Parameters for each application. The eNB2 may also provide an indication that it is congested and may not be able to accept offload for a certain type of traffic or applications, and the like.

A plurality of eNBs may exchange load info. Based on the load info and subscription, the eNB may redirect the WTRU to another cell if the measurements show that the WTRU may maintain a good connection with that cell. Thus the eNB may override a handover decision based purely on measurement reports that have to meet a certain criteria.

The system, (eNB, MME, ANDSF, OMA DM, and the like), may inform the WTRUs that at a specific time, certain QoS requests may not be possible. The WTRU may reselect cells or inform the user about this indication.

The WTRU may provide information about the flows that are in use, for example, what application is using them. The network may push this info to the RAN which may then decide to remove certain flows or the MME may inform the WTRU to remove certain flows after RAN congestion detection.

The system, for example, the MME, may provide real time indication to the charging entity about network congestion and whether or not the system has reduced a WTRU's QoS or has maintained the QoS in a time of congestion (such as for users with "Level 1" subscription) such that the charging entity may charge more since that WTRU's experience is not degraded much in spite of congestion.

Even if a user does not have a subscription for priority service, the user may be prompted to accept or decline a real time offer when congestion takes place or ahead of time. This may result in a higher charge for the user. The network may transmit this "offer" in NAS message, for example, a new or existing NAS message may be used for this purpose. The WTRU may display a request to the user to accept/decline improved service in current time of congestion. The user's response (which may already be configured by the user via the settings) may trigger the WTRU to transmit a response to the network (again the response may be a new or existing NAS message). The network may then take actions to maintain or degrade the user's quality of service depending on whether the user accepted or rejected the "offer" to maintain a better service at a higher rate. The MME may then take any of the previous actions above to implement the user's decision. For example, the MME may inform the eNB to degrade a WTRU's service if the user did not accept the "offer". This may be done in any S1AP messages, (new or existing, for example, E-RAB Modify Request or WTRU Context Modification Request).

In case of a disaster, the WTRU may be allowed to request emergency services using a predefined (limited) number of bearers with a specified QoS. The network may broadcast an indication (for example, an earthquake and tsunami warning system (ETWS) alert, a "disaster" bit), to inform the WTRUs if this needs to be performed.

It may be possible in some scenario, (such as a RAN sharing scenario or an HeNB broadcasting multiple closed subscriber group (CSG) IDs), that only part of the RAN is congested. The user with a high subscription level may be allowed to temporarily access resources from the other operators or CSGs. For example, User A is subscribed to PLMN A and it is under the coverage of operator 1 which is congested in a certain RAN sharing agreement. However, operator 2 under the same eNB is not congested. The user may not be able to register on operator 2's network. However in this case, User A may be temporarily allowed to access service from operator B so it does not experience congestion; its user experience may not be affected.

The methods and procedures described herein may also be applicable to the HeNB case where the HeNB may also be connected to a collocated or a standalone L-GW. In the case of L-GW the congestion may also be caused by the user plane traffic on the interface between the L-GW and HeNB. Therefore the congestion at HeNB may happen because of two different types of user plane interface, the S1-U interface and the direct interface with L-GW.

Although features and elements are described above in particular combinations, one of ordinary skill in the art may appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed is:

1. A method, performed by a wireless transmit/receive unit (WTRU), for managing user plane congestion in a network, the method comprising:
receiving congestion control information for each of a plurality of application-specific congestion control categories from the network, wherein the congestion control information includes a time period during which access to the network is restricted, wherein the plurality of application-specific congestion control categories includes a highest ranked application-specific congestion control category and a lowest ranked application-specific congestion control category, wherein the highest ranked application-specific congestion control category includes one or more operator identified applications subject to a least amount of restrictions, and wherein the lowest ranked application-specific congestion control category includes one or more operator identified applications subject to a most amount of restrictions;
determining not to attempt to access the network for any of the operator identified applications of the lowest ranked application-specific congestion control category based on the congestion control information for the lowest ranked application-specific congestion control category; and
transmitting a request for access to the network for at least one of the operator identified applications of the highest ranked application-specific congestion control category during the time period in which access to the network is restricted for the lowest ranked application-specific congestion control category.

2. The method of claim 1, further comprising receiving signaling including information for provisioning the WTRU with the plurality of application-specific congestion control categories.

3. The method of claim 2, further comprising:
provisioning the WTRU with the plurality of application-specific congestion control categories.

4. The method of claim 2, wherein the signaling comprises any of non-access stratum (NAS) signaling, radio resource control (RRC) signaling and open mobile alliance (OMA) signaling.

5. The method of claim 1, wherein the congestion control information further includes a data rate limit.

6. The method of claim 5, further comprising:
transmitting traffic from one or more of the operator identified applications of the highest ranked application-specific congestion control category during the time period in which access to the network is restricted for the lowest ranked application-specific congestion control category and in accordance with the data rate limit.

7. An apparatus comprising circuitry, including one or more integrated circuits, configured to:
receive congestion control information for each of a plurality of application-specific congestion control categories from the network, wherein the congestion control information includes a time period during which access to the network is restricted, wherein the plurality of application-specific congestion control categories includes a highest ranked application-specific congestion control category and a lowest ranked application-specific congestion control category, wherein the highest ranked application-specific congestion control category includes one or more operator identified applications subject to a least amount of restrictions, and wherein the lowest ranked application-specific congestion control category includes one or more operator identified applications subject to a most amount of restrictions;
determine not to attempt to access the network for any of the operator identified applications of the lowest ranked application-specific congestion control category based on the congestion control information for the lowest ranked application-specific congestion control category; and transmit a request for access to the network for at least one of the operator identified applications of the highest ranked application-specific congestion control category during the time period in which access to the network is restricted for the lowest ranked application-specific congestion control category.

8. The apparatus of claim 7, wherein the circuitry is configured to receive signaling including information for provisioning the WTRU with the plurality of application-specific congestion control categories.

9. The apparatus of claim 8, wherein the circuitry is configured to provision the WTRU with the plurality of application-specific congestion control categories.

10. The apparatus of claim 8, wherein the signaling comprises any of non-access stratum (NAS) signaling, radio resource control (RRC) signaling and open mobile alliance (OMA) signaling.

11. The apparatus of claim 7, wherein the congestion control information further includes a data rate limit.

12. The apparatus of claim 11, wherein the circuitry is configured to transmit traffic from one or more of the operator identified applications of the highest ranked application-specific congestion control category during the time period in which access to the network is restricted for the lowest ranked application-specific congestion control category and in accordance with the data rate limit.

13. A method implemented in one or more network nodes of a network, the method comprising:
transmitting signaling including information for provisioning a wireless transmit/receive unit (WTRU) with a plurality of application-specific congestion control categories, wherein the congestion control information includes a time period during which access to the network is restricted, wherein the plurality of application-specific congestion control categories included a highest ranked application-specific congestion control category and a lowest ranked application-specific congestion control category, wherein the highest ranked application-specific congestion control category includes one or more operator identified applications subject to a least amount of restrictions, and wherein the lowest ranked application-specific congestion control category includes one or more operator identified applications subject to a most amount of restrictions;
transmitting congestion control information for each of the plurality of application-specific congestion control categories to the WTRU;
receiving, from the WTRU after expiration of the time period in which access to the network is restricted for the lowest ranked application-specific congestion control category, traffic from one or more the operator identified applications of the lowest ranked application-specific congestion control category based on the congestion control information for the lowest ranked application-specific congestion control category; and
receiving, from the WTRU, traffic from one or more of the operator identified applications of the highest ranked application-specific congestion control category during the time period in which access to the network is restricted for the lowest ranked application-specific congestion control category.

14. The method of claim 13, wherein the signaling comprises any of non-access stratum (NAS) signaling, radio resource control (RRC) signaling and open mobile alliance (OMA) signaling.

15. The method of claim 13, wherein the congestion control information further includes a data rate limit.

16. The method of claim 15, further comprising:
receiving traffic from one or more of the operator identified applications of the highest ranked application-specific congestion control category during the time period in which access to the network is restricted for the lowest ranked application-specific congestion control category and in accordance with the data rate limit.

17. A network comprising one or more network nodes having circuitry, including one or more integrated circuits, configured to:
transmit signaling including information for provisioning a wireless transmit/receive unit (WTRU) with a plurality of application-specific congestion control categories, wherein the congestion control information includes a time period during which access to the network is restricted, wherein the plurality of application-specific congestion control categories included a highest ranked application-specific congestion control category and a lowest ranked application-specific congestion control category, wherein the highest ranked application-specific congestion control category includes one or more operator identified applications subject to a least amount of restrictions, and wherein the lowest ranked application-specific congestion control category includes one or more operator identified applications subject to a most amount of restrictions;
transmit congestion control information for each of the plurality of application-specific congestion control categories to the WTRU;
receive, from the WTRU after expiration of the time period in which access to the network is restricted for the lowest ranked application-specific congestion control category, traffic from one or more the operator identified applications of the lowest ranked application-specific congestion control category based on the congestion control information for the lowest ranked application-specific congestion control category; and
receive, from the WTRU, traffic from one or more of the operator identified applications of the highest ranked application-specific congestion control category during the time period in which access to the network is restricted for the lowest ranked application-specific congestion control category.

18. The network of claim 17, wherein the signaling comprises any of non-access stratum (NAS) signaling, radio resource control (RRC) signaling and open mobile alliance (OMA) signaling.

19. The network of claim 17, wherein the congestion control information further includes a data rate limit.

20. The network of claim 19, wherein the one or more network nodes are configured to:
receive traffic from one or more of the operator identified applications of the highest ranked application-specific congestion control category during the time period in which access to the network is restricted for the lowest ranked application-specific congestion control category and in accordance with the data rate limit.

* * * * *